US011743914B2

(12) United States Patent
Kwak et al.

(10) Patent No.: US 11,743,914 B2
(45) Date of Patent: Aug. 29, 2023

(54) CONTROL RESOURCE SET CONFIGURATION FOR REDUCED BANDWIDTH USER EQUIPMENTS

(71) Applicant: QUALCOMM Incorporated, San Diego, CA (US)

(72) Inventors: Yongjun Kwak, San Diego, CA (US); Jing Lei, San Diego, CA (US); Huilin Xu, Temecula, CA (US); Yuchul Kim, San Diego, CA (US); Hwan Joon Kwon, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 198 days.

(21) Appl. No.: 17/385,790

(22) Filed: Jul. 26, 2021

(65) Prior Publication Data
US 2023/0031276 A1 Feb. 2, 2023

(51) Int. Cl.
*H04W 4/00* (2018.01)
*H04W 72/23* (2023.01)
(Continued)

(52) U.S. Cl.
CPC ........... *H04W 72/23* (2023.01); *H04W 24/08* (2013.01); *H04W 72/0446* (2013.01); *H04W 72/1263* (2013.01)

(58) Field of Classification Search
CPC ................ H04W 72/23; H04W 24/08; H04W 72/0446; H04W 72/1263
See application file for complete search history.

(56) References Cited

U.S. PATENT DOCUMENTS 9,648,588 B2 * 5/2017 Kim .................... H04L 5/0051
2015/0146639 A1 * 5/2015 Seo ..................... H04L 5/0053
370/329

(Continued)

FOREIGN PATENT DOCUMENTS

WO WO-2020258216 A1 12/2020
WO WO-2021211055 A1 10/2021
(Continued)

OTHER PUBLICATIONS

International Search Report and Written Opinion—PCT/US2022/034241—ISA/EPO—dated Oct. 13, 2022 (2105076WO).
(Continued)

*Primary Examiner* — Abdelnabi O Musa
(74) *Attorney, Agent, or Firm* — Holland & Hart LLP; Kevin T. Cheatham

(57) ABSTRACT

Methods, systems, and devices for wireless communication are described. A user equipment (UE) may receive a first system information message including an indication of a resource configuration for a control resource set (CORE-SET) from a base station. The CORESET may include a common search space for a downlink control information (DCI) message that schedules a second system information message. The UE may identify a set of parameters from multiple sets of parameters for the CORESET based on the indication received in the first system information message and the UE being a first type of UE. The set of parameters may be different from a second set of parameters for the CORESET associated with a second type of UE different from the first type of UE. The UE may receive, in the CORESET according to the identified set of parameters, the DCI message scheduling the second system information message.

30 Claims, 19 Drawing Sheets

(51) Int. Cl.
*H04W 24/08* (2009.01)
*H04W 72/0446* (2023.01)
*H04W 72/1263* (2023.01)

(56) References Cited

U.S. PATENT DOCUMENTS

| | | | |
|---|---|---|---|
| 2016/0081111 A1* | 3/2016 | Yi | H04L 5/001 370/336 |
| 2018/0192383 A1* | 7/2018 | Nam | H04W 72/23 |
| 2019/0349904 A1* | 11/2019 | Kwak | H04W 72/23 |
| 2020/0228966 A1* | 7/2020 | Xu | H04W 56/001 |
| 2020/0245301 A1* | 7/2020 | Jo | H04J 11/00 |
| 2020/0296576 A1* | 9/2020 | Ouchi | H04L 5/001 |
| 2021/0068191 A1* | 3/2021 | Liu | H04W 72/0446 |
| 2021/0105808 A1* | 4/2021 | Lei | H04L 5/0044 |
| 2021/0195532 A1* | 6/2021 | Ouchi | H04W 52/50 |
| 2021/0258967 A1* | 8/2021 | Zhang | H04W 72/53 |
| 2021/0289536 A1* | 9/2021 | Liu | H04W 74/0841 |
| 2021/0351865 A1* | 11/2021 | Ouchi | H04W 8/24 |
| 2021/0382978 A1* | 12/2021 | Jeon | G06F 21/74 |
| 2021/0400706 A1* | 12/2021 | Aiba | H04L 1/0061 |
| 2022/0015019 A1* | 1/2022 | Park | H04W 72/04 |
| 2022/0304014 A1* | 9/2022 | Li | H04L 5/0092 |
| 2023/0019993 A1* | 1/2023 | Babaei | H04W 36/305 |

FOREIGN PATENT DOCUMENTS

| | | |
|---|---|---|
| WO | WO-2021230730 A1 | 11/2021 |
| WO | WO-2021231816 A1 | 11/2021 |

OTHER PUBLICATIONS

LG Electronics Inc: "Higher Layer Support for Reduced Capability NR Devices", 3GPP TSG RAN WG1 Meeting #105-e, R1-2105432, 3rd Generation Partnership Project (3GPP), Mobile Competence Centre, 650, Route Des Lucioles, F-06921 Sophia-Antipolis Cedex, France, vol. RAN WG1, No. Online, May 10, 2021-May 27, 2021, May 12, 2021, 6 Pages, XP052011445, p. 2, Lines 6-11.

SAMSUNG: "Discussion on Bandwidth for RedCap UE", 3GPP TSG RAN WG1 #104b-e, R1-2103246, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021, 8 Pages, XP052178023, p. 4, Lines 30-35.

* cited by examiner

CONTROL RESOURCE SET CONFIGURATION FOR REDUCED BANDWIDTH USER EQUIPMENTS

FIELD OF TECHNOLOGY

The following relates to wireless communication, including control resource set configuration for reduced bandwidth user equipments (UEs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some UEs may be configured to support a reduced operating bandwidth (e.g., less than 20 megahertz (MHz)) to reduce power consumption, UE complexity, or both. The UEs that support the reduced bandwidth and other UEs that support a larger operating bandwidth may receive a configuration for a control resource set (CORESET) zero (e.g., CORESET #0) via a synchronization signal block (SSB) that consists of 20 resource blocks in the frequency domain.

SUMMARY

The described techniques relate to improved methods, systems, devices, and apparatuses that support control resource set (CORESET) configuration for reduced bandwidth user equipments (UEs). Generally, the described techniques provide for a CORESET configuration to be shared between a first UE (e.g., a reduced capability UE) and a second UE. The first UE may support a reduced operating bandwidth (e.g., 20 megahertz (MHz) or less) to reduce power consumption and UE complexity. The second UE may support a larger operating bandwidth (e.g., 20 MHz or larger). The first UE may receive a first system information message including an indication of a resource configuration for a CORESET. The CORESET may include a common search space for a downlink control information (DCI) message that schedules a second system information message. The first UE may identify a set of parameters for the CORESET based on the indication received in the first system information and the first UE supporting the reduced operating bandwidth. The UE may identify the set of parameters from a first group of sets of parameters that may be different from a second group of sets of parameters for the CORESET associated with the second UE that supports the larger operating bandwidth. The first UE may receive, in the CORESET and according to the identified set of parameters, the DCI message scheduling the second system information message. In some examples, the second UE may receive a second DCI message in the CORESET according to the second set of parameters. A base station may thereby differentiate a configuration for a CORESET for the first UE supporting the reduced operating bandwidth from a configuration for a CORESET for the second UE supporting the larger operating bandwidth.

A method for wireless communication at a UE is described. The method may include receiving a first system information message from a base station, the first system information message including an indication of a resource configuration for a CORESET, the CORESET including a common search space for a DCI message that schedules a second system information message, identifying a set of parameters from a first set of multiple sets of parameters for the CORESET based on the indication received in the first system information message and the UE being a first type of UE, the first set of multiple sets of parameters different from a second set of multiple sets of parameters for the CORESET associated with a second type of UE different from the first type of UE, and receiving, in the CORESET according to the identified set of parameters, the DCI message scheduling the second system information message.

An apparatus for wireless communication at a UE is described. The apparatus may include a processor, memory coupled with the processor, and instructions stored in the memory. The instructions may be executable by the processor to cause the apparatus to receive a first system information message from a base station, the first system information message including an indication of a resource configuration for a CORESET, the CORESET including a common search space for a DCI message that schedules a second system information message, identify a set of parameters from a first set of multiple sets of parameters for the CORESET based on the indication received in the first system information message and the UE being a first type of UE, the first set of multiple sets of parameters different from a second set of multiple sets of parameters for the CORESET associated with a second type of UE different from the first type of UE, and receive, in the CORESET according to the identified set of parameters, the DCI message scheduling the second system information message.

Another apparatus for wireless communication at a UE is described. The apparatus may include means for receiving a first system information message from a base station, the first system information message including an indication of a resource configuration for a CORESET, the CORESET including a common search space for a DCI message that schedules a second system information message, means for identifying a set of parameters from a first set of multiple sets of parameters for the CORESET based on the indication received in the first system information message and the UE being a first type of UE, the first set of multiple sets of parameters different from a second set of multiple sets of parameters for the CORESET associated with a second type of UE different from the first type of UE, and means for receiving, in the CORESET according to the identified set of parameters, the DCI message scheduling the second system information message.

A non-transitory computer-readable medium storing code for wireless communication at a UE is described. The code may include instructions executable by a processor to receive a first system information message from a base station, the first system information message including an indication of a resource configuration for a CORESET, the CORESET including a common search space for a DCI message that schedules a second system information message, identify a set of parameters from a first set of multiple sets of parameters for the CORESET based on the indication received in the first system information message and the UE being a first type of UE, the first set of multiple sets of parameters different from a second set of multiple sets of parameters for the CORESET associated with a second type of UE different from the first type of UE, and receive, in the CORESET according to the identified set of parameters, the DCI message scheduling the second system information message.

In some examples of the method, apparatuses, and non-transitory computer-readable medium described herein, identifying the set of parameters from the first set of multiple sets of parameters may include operations, features, means, or instructions for identifying a first quantity of physical resource blocks (PRBs) for the CORESET based on the UE being the first type of UE, where the indication of the resource configuration for the CORESET may be indicative of a second quantity of PRBs different from the first quantity of PRBs.

Some examples of the method, apparatuses, and non-transitory computer-readable medium described herein may further include operations, features, means, or instructions for identifying, based on the UE being the first type of UE, that PRBs of the CORESET may be sequential, where CORESETs including common search spaces configured for the second system information message may be interleaved for the second type of UE.

Some examples of the method, apparatuses, and non-transitory computer-readable medium described herein may further include operations, features, means, or instructions for monitoring the CORESET for the DCI message in a set of slots according to the identified set of parameters, the CORESET monitored in each slot of the set of slots by both at least one of the first type of UE and at least one of the second type of UE, where the DCI message may be received based on the monitoring.

In some examples of the method, apparatuses, and non-transitory computer-readable medium described herein, identifying the set of parameters from the first set of multiple sets of parameters may include operations, features, means, or instructions for identifying a first set of slots in which to monitor the CORESET based on the UE being the first type of UE, a second set of slots configured for the second type of UE to monitor the CORESET, where the first set of slots may be different from the second set of slots.

In some examples of the method, apparatuses, and non-transitory computer-readable medium described herein, receiving the DCI message may include operations, features, means, or instructions for receiving a downlink signal in the CORESET according to the identified set of parameters and decoding the received downlink signal using a first system information radio network temporary identifier (SI-RNTI) associated with the first type of UE to receive the DCI message for the UE, the first SI-RNTI different from a second SI-RNTI associated with the second type of UE.

In some examples of the method, apparatuses, and non-transitory computer-readable medium described herein, receiving the DCI message may include operations, features, means, or instructions for receiving, in the DCI message, first scheduling information and second scheduling information, the first scheduling information scheduling the second system information message for the first type of UE, and the second scheduling information scheduling a second system information message for the second type of UE.

Some examples of the method, apparatuses, and non-transitory computer-readable medium described herein may further include operations, features, means, or instructions for identifying one or more candidate sizes for the DCI message scheduling the second system information message based on the DCI message being for the first type of UE, where the one or more candidate sizes for the DCI message scheduling the second system information message for the first type of UE may be different from one or more candidate sizes for the DCI message scheduling the second system information message for the second type of UE.

In some examples of the method, apparatuses, and non-transitory computer-readable medium described herein, the first set of multiple sets of parameters associated with the first type of UE may be a subset of the second set of multiple sets of parameters associated with the second type of UE.

In some examples of the method, apparatuses, and non-transitory computer-readable medium described herein, the set of parameters of the first set of multiple sets of parameters include a multiplexing pattern between a synchronization signal block (SSB) that includes the first system information message and the CORESET, a number of resource blocks for the CORESET, a number of symbols for the CORESET, an offset for the CORESET, or a combination thereof.

In some examples of the method, apparatuses, and non-transitory computer-readable medium described herein, the first type of UE may be associated with a reduced bandwidth capability relative to the second type of UE.

A method for wireless communication at a base station is described. The method may include transmitting a first system information message to a UE, the first system information message including an indication of a resource configuration for a CORESET for a first type of UE, the CORESET including a common search space for a DCI message that schedules a second system information message, identifying a set of parameters from a first set of multiple sets of parameters for the CORESET based on the indication transmitted in the first system information message and the CORESET being for the first type of UE, the first set of multiple sets of parameters different from a second set of multiple sets of parameters for the CORESET associated with a second type of UE different from the first type of UE, and transmitting, in the CORESET according to the identified set of parameters, the DCI message scheduling the second system information message.

An apparatus for wireless communication at a base station is described. The apparatus may include a processor, memory coupled with the processor, and instructions stored in the memory. The instructions may be executable by the processor to cause the apparatus to transmit a first system information message to a UE, the first system information message including an indication of a resource configuration for a CORESET for a first type of UE, the CORESET including a common search space for a DCI message that schedules a second system information message, identify a set of parameters from a first set of multiple sets of parameters for the CORESET based on the indication transmitted in the first system information message and the CORESET being for the first type of UE, the first set of multiple sets of parameters different from a second set of multiple sets of parameters for the CORESET associated with a second type of UE different from the first type of UE, and transmit, in the CORESET according to the identified set of parameters, the DCI message scheduling the second system information message.

Another apparatus for wireless communication at a base station is described. The apparatus may include means for transmitting a first system information message to a UE, the first system information message including an indication of a resource configuration for a CORESET for a first type of UE, the CORESET including a common search space for a DCI message that schedules a second system information message, means for identifying a set of parameters from a first set of multiple sets of parameters for the CORESET based on the indication transmitted in the first system information message and the CORESET being for the first type of UE, the first set of multiple sets of parameters different from a second set of multiple sets of parameters for the CORESET associated with a second type of UE different from the first type of UE, and means for transmitting, in the CORESET according to the identified set of parameters, the DCI message scheduling the second system information message.

A non-transitory computer-readable medium storing code for wireless communication at a base station is described. The code may include instructions executable by a processor to transmit a first system information message to a UE, the first system information message including an indication of a resource configuration for a CORESET for a first type of UE, the CORESET including a common search space for a DCI message that schedules a second system information message, identify a set of parameters from a first set of multiple sets of parameters for the CORESET based on the indication transmitted in the first system information message and the CORESET being for the first type of UE, the first set of multiple sets of parameters different from a second set of multiple sets of parameters for the CORESET associated with a second type of UE different from the first type of UE, and transmit, in the CORESET according to the identified set of parameters, the DCI message scheduling the second system information message.

In some examples of the method, apparatuses, and non-transitory computer-readable medium described herein, identifying the set of parameters from the first set of multiple sets of parameters may include operations, features, means, or instructions for identifying a first quantity of PRBs for the CORESET based on the CORESET being for the first type of UE, where the indication of the resource configuration for the CORESET may be indicative of a second quantity of PRBs different from the first quantity of PRBs.

Some examples of the method, apparatuses, and non-transitory computer-readable medium described herein may further include operations, features, means, or instructions for identifying, based on the CORESET being for the first type of UE, that PRBs of the CORESET may be sequential, where CORESETs including common search spaces configured for the second system information message may be interleaved for the second type of UE.

In some examples of the method, apparatuses, and non-transitory computer-readable medium described herein, identifying the set of parameters from the first set of multiple sets of parameters may include operations, features, means, or instructions for identifying a first set of slots in which to monitor the CORESET based on the CORESET being for the first type of UE, a second set of slots configured for the second type of UE to monitor the CORESET, where the first set of slots may be different from the second set of slots.

In some examples of the method, apparatuses, and non-transitory computer-readable medium described herein, transmitting the DCI message may include operations, features, means, or instructions for encoding the DCI message using a first SI-RNTI associated with the first type of UE, the first SI-RNTI different from a second SI-RNTI associated with the second type of UE.

In some examples of the method, apparatuses, and non-transitory computer-readable medium described herein, transmitting the DCI message may include operations, features, means, or instructions for transmitting, in the DCI message, first scheduling information and second scheduling information, the first scheduling information scheduling the second system information message for the first type of UE, and the second scheduling information scheduling a second system information message for the second type of UE.

In some examples of the method, apparatuses, and non-transitory computer-readable medium described herein, the DCI message may be one of one or more candidate sizes for the DCI message scheduling the second system information message based on the DCI message being for the first type of UE, and the one or more candidate sizes for the DCI message scheduling the second system information message for the first type of UE may be different from one or more candidate sizes for the DCI message scheduling the second system information message for the second type of UE.

In some examples of the method, apparatuses, and non-transitory computer-readable medium described herein, the first set of multiple sets of parameters associated with the first type of UE may be a subset of the second set of multiple sets of parameters associated with the second type of UE.

In some examples of the method, apparatuses, and non-transitory computer-readable medium described herein, the set of parameters of the first set of multiple sets of parameters include a multiplexing pattern between an SSB that includes the first system information message and the CORESET, a number of resource blocks for the CORESET, a number of symbols for the CORESET, an offset for the CORESET, or a combination thereof.

In some examples of the method, apparatuses, and non-transitory computer-readable medium described herein, the first type of UE may be associated with a reduced bandwidth capability relative to the second type of UE.

DETAILED DESCRIPTION

Figure 1:
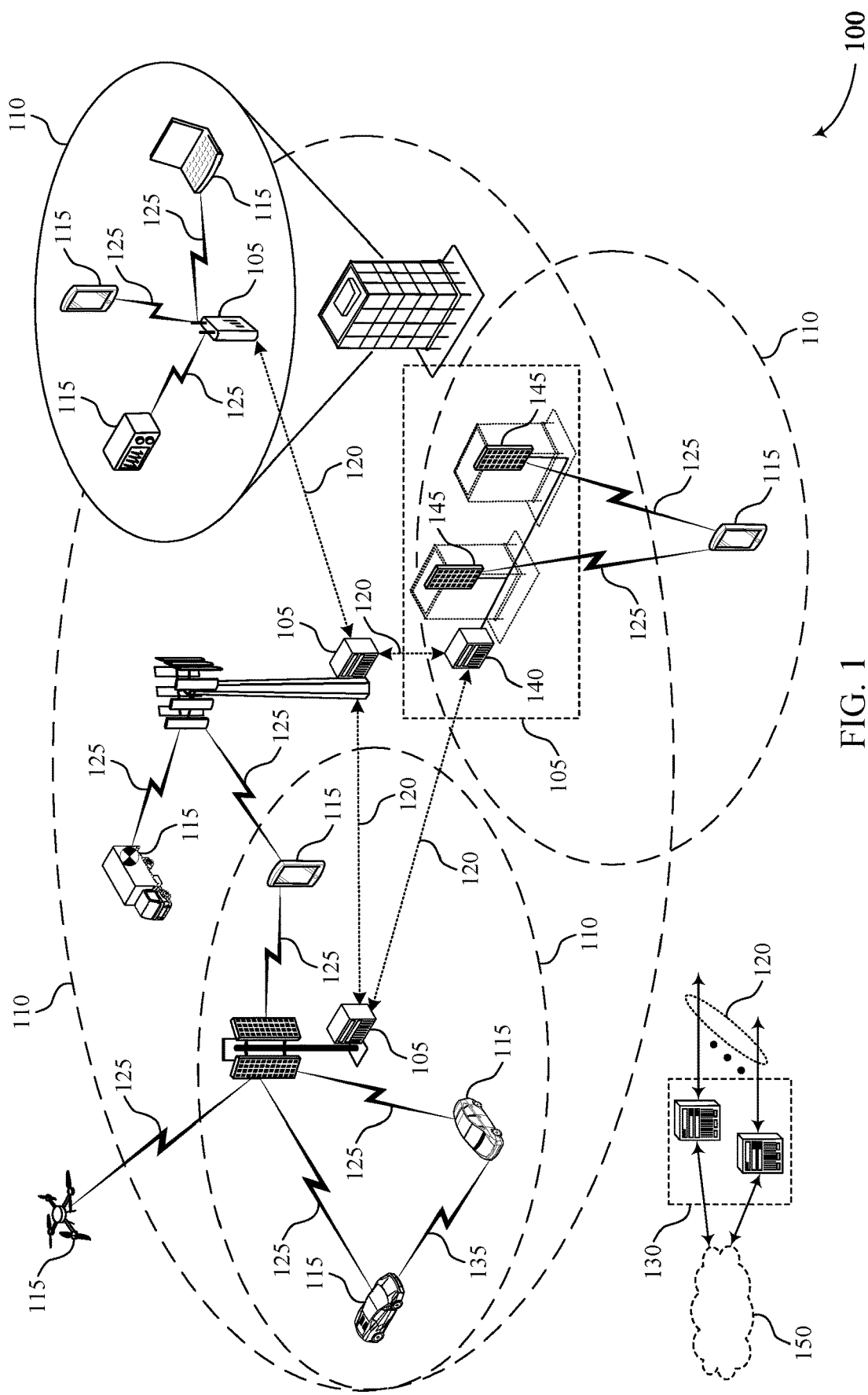
FIG. 1 illustrates an example of a wireless communications system that supports control resource set (CORESET) configuration for reduced bandwidth user equipments (UEs) in accordance with aspects of the present disclosure.

In some wireless communications systems, one or more user equipments (UEs) may monitor an initial control resource set (CORESET) (e.g., a CORESET #0) for control information. For example, the initial CORESET may convey control information for scheduling a subsequent system information message (e.g., a system information block (SIB)). Some UEs may be configured to support a reduced operating bandwidth to reduce power consumption and UE complexity. For example, a reduced operating bandwidth may include a bandwidth of less than 20 MHz, or less than 100 resource blocks. In some examples, the reduced operating bandwidth may be about 10 MHz, 5 MHz, 4 MHz, or some other bandwidth. Additionally, or alternatively, the reduced operating bandwidth for a UE may be a number of resource blocks less than 100 resource blocks, for example, 50 resource blocks, 25 resource blocks, 20 resource blocks, or some other number of resource blocks. The UEs supporting the reduced operating bandwidth and other UEs that support a larger operating bandwidth may receive a configuration for an initial CORESET via a synchronization signal block (SSB). In some cases, the configuration for the initial CORESET may indicate a CORESET that occupies more resource blocks in the frequency domain than are supported by the reduced bandwidth. Additionally or alternatively, UEs supporting different bandwidth sizes may not differentiate between CORESET configurations, control messages within the CORESET, or both.

A base station may utilize one or more techniques as described herein to share a configuration for an initial CORESET between a first set of UEs that support a reduced operating bandwidth and a second set of UEs that support wider operating bandwidths. The configuration for the initial CORESET may include a first set of bits that indicate a first configuration for the CORESET in the time and frequency domain and a second set of bits that indicate a second configuration of a downlink control channel monitoring pattern for the CORESET. A value of the first set of bits may represent an index to one of a set of time and frequency resource configurations for the CORESET. If a base station supports communications with at least one UE of the first set of UEs, the base station and the first set of UEs may be configured to support a subset of the index values that map to CORESET configurations having a reduced quantity of resource blocks in the frequency domain that is supported by the reduced bandwidth. Additionally or alternatively, the first set of UEs may be configured to assume the CORESET configuration occupies the reduced quantity of resource blocks regardless of the indicated CORESET configuration.

To reduce potential for collisions between control channel candidates in the shared CORESET, the first set of UEs may be configured with a non-interleaved mapping of control channel candidates and the second set of UEs may be configured with an interleaved mapping of control channel candidates in the CORESET. In some examples, the first set of UEs may be configured with a different downlink control channel monitoring pattern than the second set of UEs. For example, the first set of UEs and the second set of UEs may be configured to monitor for the control channel in alternating radio frames to reduce overlap between control channels in a slot. The downlink channels within the CORESET may be differentiable between the first set of UEs and the second set of UEs based on a radio network temporary identifier (RNTI), a set of reserved bits in a downlink control information (DCI) format, or a size of DCI.

Aspects of the disclosure are initially described in the context of wireless communications systems. Additional aspects are described in the with reference to resource configurations, control channel monitoring timelines, and process flows. Aspects of the disclosure are further illustrated by and described with reference to apparatus diagrams, system diagrams, and flowcharts that relate to CORESET configuration for reduced bandwidth UEs.

FIG. 1 illustrates an example of a wireless communications system 100 that supports CORESET configuration for reduced bandwidth UEs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARD) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a first type of UE 115 (e.g., a reduced capability UE 115) may support a reduced operating bandwidth (e.g., 20 megahertz (MHz) or less) to reduce power consumption and UE complexity and a second type of UE 115 may support a larger operating bandwidth. The UEs 115 may receive a configuration for a CORESET zero via an SSB that consists of 20 resource blocks in the frequency domain. In some examples, a CORESET configuration may be shared between a first UE 115 of the first type of UEs 115 and a second UE 115 of the second type of UEs 115. The first UE may receive a first system information message including an indication of a resource configuration for a CORESET. The CORESET may include a common search space for a DCI message that schedules a second system information message. The first UE 115 may identify a set of parameters for the CORESET based on the indication received in the first system information and the first UE 115 supporting the reduced operating bandwidth. The UE may identify the set of parameters from a first group of sets of parameters that may be different from a second group of sets of parameters for the CORESET associated with the second UE that supports the larger operating bandwidth. The first UE 115 may receive, in the CORESET and according to the identified set of parameters, the DCI message scheduling the second system information message. In some examples, the second UE 115 may receive a second DCI message in the CORESET according to the second set of parameters. A base station 105 may thereby differentiate a configuration for a CORESET for the first UE 115 supporting the reduced operating bandwidth from a configuration for a CORESET for the second UE 115 supporting the larger operating bandwidth.

Figure 2:
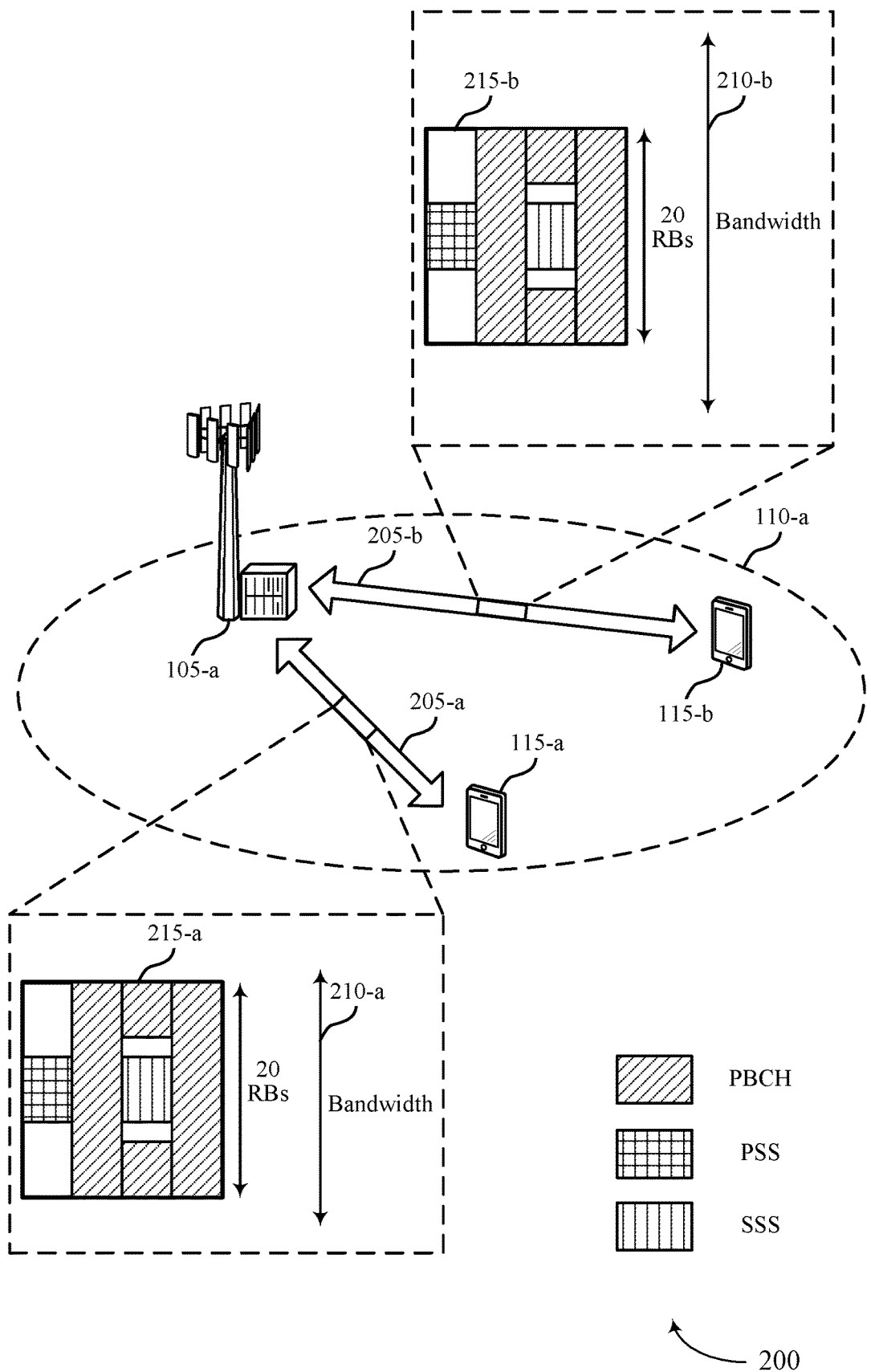
FIG. 2 illustrates an example of a wireless communications system that supports CORESET configuration for reduced bandwidth UEs in accordance with aspects of the present disclosure.

FIG. 2 illustrates an example of a wireless communications system 200 that supports CORESET configuration for reduced bandwidth UEs in accordance with aspects of the present disclosure. The wireless communications system 200 may include a base station 105-a, a UE 115-a and a UE 115-b (e.g., among other UEs 115), which may represent examples of a base station 105 and a UE 115 as described with reference to FIG. 1. The base station 105-a may communicate with the UEs 115-a and 115-b via communication links 205-a and 205-b, respectively in a geographic coverage area 110-a. In some examples, the base station 105-a may transmit a configuration for an initial CORESET, such as a CORESET zero via an SSB 215 to the UE 115-a, the UE 115-b, or both.

The UE 115-a may represent a first type of UE 115 that supports a first bandwidth 210-a. For example, the first bandwidth 210-a may be a bandwidth of less than 20 MHz, or less than 100 resource blocks. In some examples, the first bandwidth 210-a may be about 10 MHz, 5 MHz, 4 MHz, or some other bandwidth. Additionally, or alternatively, the first bandwidth 210-a may be in a number of resource blocks less than 100 resource blocks, for example, 50 resource blocks, 25 resource blocks, 20 resource blocks, or some other number of resource blocks. The UE 115-b may represent a second type of UE 115 that supports a second bandwidth 210-b (e.g., 100 MHz, 20 MHz, or some other bandwidth) that is wider (e.g., greater or larger) than the first bandwidth 210-a. In some examples, the UE 115-a may be referred to as a superlight UE 115-a or a reduced capability (e.g., Redcap) UE 115-a and the UE 115-b may be referred to as a normal or legacy UE 115-b, a light UE 115-b (e.g., an NR light UE 115-b), or a Redcap UE 115-b. The superlight UE 115-a may be configured with reduced UE capabilities (e.g., less capability than the UE 115-b), for example to support low power wide area (LPWA) use cases (e.g., asset tracking, personal IoT, metering devices, or the like). In some examples, reduced UE capabilities may reduce peak throughput, latency, and reliability requirements, and provide for improved coverage, reduced complexity, reduced cost, and reduced power consumption.

The UE 115-a and other UEs 115 that support the reduced bandwidth 210-a may reuse a subset of communication parameters that are used by the UE 115-b and other UEs 115 that support the wider bandwidth 210-b. For example, configuration parameters for a physical random access channel (PRACH), a physical downlink shared channel (PDSCH), a physical downlink control channel (PDCCH), a physical uplink shared channel (PUSCH), a physical uplink control channel (PUCCH), a sounding reference signal (SRS), a channel state information (CSI) reference signal (CSI-RS), a tracking reference signal (TRS), a physical sidelink broadcast channel (PSBCH), a primary synchronization signal (PSS) (e.g., a sidelink PSS), or any combination thereof may be the same for the reduced bandwidth 210-a and the wider bandwidth 210-b. Some other parameters for the reduced bandwidth 210-a may be different than parameters for the wider bandwidth 210-b. For example, configuration parameters for a PSS, a secondary synchronization signal (SSS), a physical broadcast channel (PBCH), a CORESET (e.g., CORESET #0), or any combination thereof may or may not be the same for the reduced bandwidth 210-a and the wider bandwidth 210-b. That is, depending on a size of the reduced bandwidth 210-a, the UE 115-a may or may not reuse the parameters for PSS, SSS, PBCH, CORESET #0, or any combination thereof.

The UE 115-a may support a different transmission bandwidth configuration (e.g., a maximum supported quantity of resource blocks in the frequency domain, such as $N_{RB}$) depending on the size of the bandwidth 210-a and a subcarrier spacing (SCS) value. In one example, if the UE 115-a is configured to communicate according to a 15 kHz SCS, the UE 115-a may support 25 resource blocks in the frequency domain for a 5 MHz bandwidth or 52 resource blocks in the frequency domain for a 10 MHz bandwidth. If the UE 115-a is configured to communicate according to a 30 kHz SCS, the UE 115-a may support 11 resource blocks in the frequency domain for a 5 MHz bandwidth or 24 resource blocks in the frequency domain for a 10 MHz bandwidth. It is to be understood that the aforementioned SCS, bandwidth, and resource block combinations are provided as examples, and a UE 115 may support any combination of SCSs, bandwidths, and resource blocks in addition to or instead of the example combinations described herein.

The base station 105-a may transmit configuration information to the UEs 115-a and 115-b via the SSBs 215-a and 215-b. Each SSB 215 may be configured to include 20 resource blocks (e.g., physical resource blocks (PRBs)) in the frequency domain (e.g., 240 subcarriers), and a quantity of symbols in the time domain (e.g., four OFDM symbols, or some other quantity). As illustrated in FIG. 2, an SSB 215 may include resources for conveying a PBCH, PSS, SSS, or any combination thereof. The PSS and SSS may be transmitted within a subset of the resource blocks of the SSB 215 (e.g., 12 resource blocks and 144 subcarriers). The base station 105-a may transmit a master information block (MIB) via the PBCH within the SSB 215 during early initial access. The MIB may include one or more information fields configured to convey respective configuration information for a UE 115. An example configuration of system information fields within a MIB and PBCH is provided in Table 1.

TABLE 1

Example PBCH Fields

| | Information Field (FR1) | Number of Bits |
|---|---|---|
| L1 | Least Significant Bit (LSB) System Frame Number (SFN) | 4 |
| | Half Radio Frame | 1 |
| | Most Significant Bit (MSB) SSB Index | 0 |
| | MSB SSB Frequency Offset | 1 |
| | Reserved | 2 |
| L2 | MSB SFN | 6 |
| | Subcarrier Spacing Indication | 1 |
| | SSB Frequency Offset | 4 |
| | Demodulation Reference Signal (DMRS) Type A Position | 1 |
| | pdcch-ConfigSIB1 | 8 |
| | Cell Barred | 1 |
| | Intra-Frequency Reselection | 1 |
| | Spare | 1 |

As provided in Table 1, the PBCH, the MIB, or both may include information fields to convey an SFN, an indication of whether the SSB 215 is transmitted in the first or second half of a radio frame, an SSB index and offset for frame synchronization, an SCS configuration for a SIB-1 message, an initial access message, and/or other system information messages, an SSB frequency offset value (e.g., $K_{SSB}$), a position of a first DMRS symbol for downlink (e.g., PDSCH) or uplink (e.g., PUSCH), a PDCCH configuration (e.g., pdcch-ConfigSIB1) for a CORESET #0 and search space set zero, an indication of whether UEs 115 in the cell are allowed to access the cell (e.g., cell barred), a cell selection or reselection to intra-frequency cells, or any combination thereof. Although Table 1 provides a set of example fields and parameters conveyed via a PBCH, it is to be understood that a PBCH, a MIB, or both may include any quantity of fields conveyed via any quantity of bits, including fields and parameters not provided in Table 1.

In some cases, the reduced bandwidth 210-a for the UE 115-a may not support the 20 resource blocks of SSB 215. For example, if the UE 115-a is configured with a 5 MHz bandwidth 210-a for 30 kHz SCS, the bandwidth 210-a may include 11 resource blocks or less. To provide for the base station 105-a to utilize the same SSB 215 configuration for transmitting the MIB to each type of UE 115, the UE 115-a and other UEs 115 that support the reduced bandwidth 210-a may be configured with a 5 MHz or greater bandwidth 210-a for 15 kHz SCS (e.g., FR1 frequency division duplex (FDD) band) and a 10 MHz or greater bandwidth for 30 kHz SCS (e.g., FR1 time division duplex (TDD) band). The UE 115-a may thereby support a reduced bandwidth 210-a (e.g., less than 20 MHz) that includes sufficient resource blocks in the frequency domain to also support the configuration for the SSB 215.

Accordingly, the reduced bandwidth 210-a and the bandwidth 210-b may both include at least 20 resource blocks in the frequency domain, such that the base station 105-a may transmit the SSB 215-a and the SSB 215-b to the UEs 115-a and 115-b, respectively, according to a same SSB configuration. The base station 105-a may thereby reuse a configuration for an initial CORESET for each of the UEs 115-a and 115-b. The initial CORESET may include control channel candidates for the UEs 115 to monitor for control information that schedules a system information message, such as SIB-1. The configuration for the CORESET (e.g., pdcch-ConfigSIB1) may be conveyed via a field in a MIB, as provided in Table 1. The configuration may include a first quantity of bits (e.g., four bits) to indicate a resource configuration for the CORESET and a second quantity of bits (e.g., four bits) to indicate a PDCCH monitoring pattern in a time domain.

As described herein, the base station 105-a may utilize one or more techniques for sharing the CORESET configuration between UEs 115 that support the reduced bandwidth 210-a and UEs 115 that support the wider bandwidth 210-b. The base station 105-a may use a same field to convey a configuration for the frequency domain resources in a CORESET for the UE 115-a and the UE 115-b by utilizing a subset of CORESET configurations that include 24 resource blocks or less. In other examples, the UE 115-a may be configured to assume that a CORESET for the UE 115-a occupies 24 resource blocks or less irrespective of a CORESET configuration for the UE 115-b. The base station 105-a may additionally or alternatively configure a CORESET for the UE 115-a with a non-interleaved resource element group (REG) to control channel element (CCE) mapping, and the CORESET for the UE 115-b may be configured with an interleaved REG to CCE mapping, such that a potential for collisions between the control channel candidates for different types of UEs 115 may be reduced. Details of such frequency domain CORESET configurations are described in further detail elsewhere herein, including with reference to FIGS. 3 through 5.

The base station 105-a may, in some examples, configure a first PDCCH monitoring pattern for the UE 115-a and a second PDCCH monitoring pattern for the UE 115-b that is different from the first PDCCH monitoring pattern. For example, the CORESET configuration field in the MIB may indicate that the UE 115-a is to monitor every even radio frame and the UE 115-b is to monitor every odd radio frame, or vice versa. In other examples, the base station 105-a may configure separate CORESETs for each type of UE 115 within a set of two or more slots configured for each SSB 215. Details of the PDCCH monitoring pattern configurations are described in further detail elsewhere herein, including with reference to FIGS. 6A and 6B.

The UE 115-a that supports the reduced bandwidth 210-a and the UE 115-b that supports the bandwidth 210-b may thereby both receive a configuration for an initial CORESET (e.g., CORESET #0) via an SSB 215 having a same configuration. The configuration for the CORESET may be reused for both types of UEs 115, and control information transmitted via the CORESET may be configured according to one or more techniques such that the UEs 115 may differentiate SIB-1 reception. Such configuration techniques may provide for reduced UE complexity, reduced power consumption, and improved coordination between devices.

Figure 3:
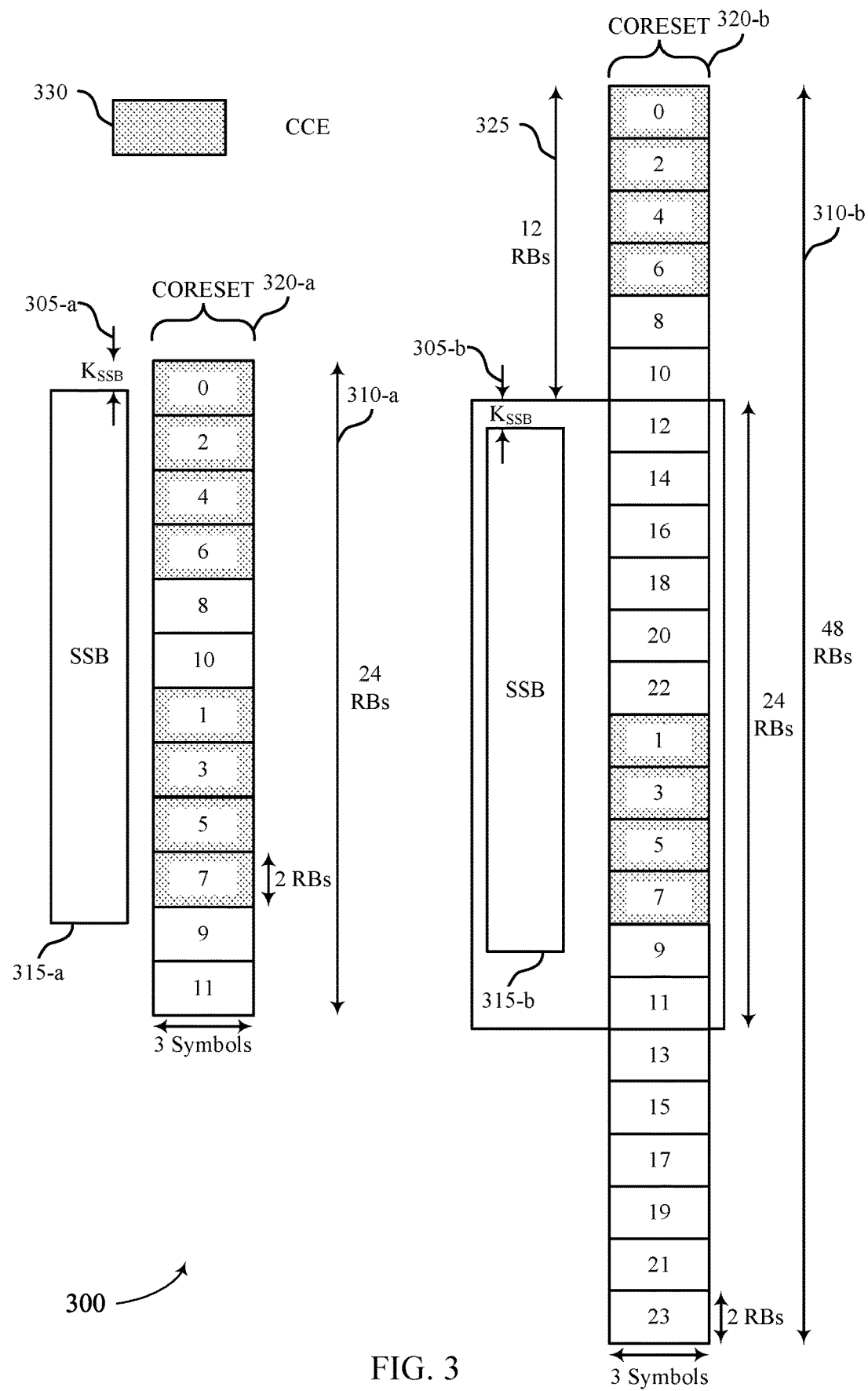
FIG. 3 illustrates an example of a resource configuration that supports CORESET configuration for reduced bandwidth UEs in accordance with aspects of the present disclosure.

FIG. 3 illustrates an example of a resource configuration 300 that supports CORESET configuration for reduced bandwidth UEs in accordance with aspects of the present disclosure. The resource configuration 300 illustrates example configurations of symbols and resource blocks within a first CORESET 320-a and a second CORESET 320-b and with respect to SSBs 315-a and 315-b that configure the respective CORESETs 320. Each CORESET 320 may include a quantity of resource blocks in accordance with the respective resource configuration 300. The resource configuration 300 may represent a configuration of resources according to a 15 kHz SCS.

In the example of FIG. 3, each CCE 330 in a CORESET 320 may be mapped to one or more REGs according to an interleaved REG to CCE mapping pattern. In some other examples, the CCEs 330 and REGs may be mapped according to a non-interleaved mapping pattern. An aggregation level for a CORESET 320 may indicate a quantity of CCEs 330 within the CORESET 320, and a quantity of resource blocks within each CCE 330 may vary. The CCEs 330 in the CORESETs 320-a and 320-b may each include two resource blocks. A mapping may be configured between aggregation levels and a quantity of control channel candidates within the CORESET 320. For example, an aggregation level of four may correspond to four control channel candidates, an aggregation level of eight may correspond to two control channel candidates, and an aggregation level of 16 may correspond to one control channel candidate (e.g., for a Type0 common search space). In the example of FIG. 3, the CORESETs 320-a and 320-b may each be configured with an aggregation level of eight and include two control channel candidates.

The CORESET 320-a may be an example of a CORESET 320 that may be supported by a first UE 115 that supports a reduced bandwidth 310-a. The first UE 115 and the reduced bandwidth 310-a may be examples of the UE 115-a and the reduced bandwidth 210-a, as described with reference to FIG. 2. Although the reduced bandwidth 310-a is illustrated including 24 resource blocks, the reduced bandwidth for a first type of UE 115 may include any quantity of resource blocks (e.g., 25 resource blocks or less in a 5 MHz bandwidth for 15 kHz SCS, as described with reference to FIG. 2). The CORESET 320-b may be an example CORESET 320 for a second UE 115 that supports a bandwidth 310-b that is greater than the reduced bandwidth 310-a. The second UE 115 and the bandwidth 310-b may represent examples of the UE 115-b and the bandwidth 210-b, as described with reference to FIG. 2. Although the bandwidth 310-b is illustrated including 48 resource blocks, the bandwidth may include any quantity of resource blocks that is greater than the quantity of resource blocks included in the reduced bandwidth 310-a.

As described with reference to FIG. 2, the first and second UEs 115 may receive an indication of configurations for the CORESET 320-a and the CORESET 320-b via a first MIB within the SSB 315-a and a second MIB within the SSB 315-b, respectively. The SSBs 315-a and 315-b may be examples of the SSBs 215 described with reference to FIG. 2, for example, each SSB 315 may occupy 20 resource blocks in the frequency domain. As provided in Table 1, each MIB may include an SSB frequency offset parameter that may indicate a frequency offset 305 for the SSB 315 (e.g., frequency offsets 305-a and 305-b). Each MIB may additionally or alternatively include a quantity of bits (e.g., four bits within a field, such as the pdcch-ConfigSIB1 field provided in Table 1) to indicate a configuration of symbols and resource blocks for a CORESET 320. A value of the bits may map to one of a set of indices corresponding to a set of possible configurations for a CORESET 320. Table 2 provides an example set of configurations for symbols and resource blocks in a CORESET 320 (e.g., a CORESET #0) at 15 kHz SCS.

TABLE 2

CORESET Resource Block and Symbol
Configurations for 15 kHz SCS

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | | Reserved | | |

Each value of the bits in the indicated configuration may map to a respective index in Table 2. In the example of FIG. 3, the CORESET 320-a may be configured according to the index three, and the CORESET 320-b may be configured according to the index 10. That is, the first UE 115 may decode a CORESET configuration within the SSB 315-a and determine a value of the CORESET configuration bits is three. The first UE 115 may thereby determine, based on the mapping provided in Table 2, that there are 24 resource blocks in the CORESET 320-a, the CORESET 320-a occupies three symbols, and an offset 325 between the SSB 315-a and the CORESET 320-a is zero resource blocks. The second UE 115 may decode a CORESET configuration within the SSB 315-b and determine a value of the CORESET configuration bits is 10. The second UE 115 may thereby determine, based on the mapping provided in Table 2, that there are 48 resource blocks in the CORESET 320-b, the CORESET 320-b occupies three symbols, and an offset 325 between the SSB 315-b and the CORESET 320-b is 12 resource blocks. It is to be understood that a CORESET configuration may be indicated via any quantity of bits that may map to any quantity of possible CORESET configurations, including symbol and resource block configurations that are the same as or different than the configurations provided in Table 2.

In some cases, a CORESET configuration for the first UE 115 that supports the reduced bandwidth 310-a may map to an index value of six or greater, such that the CORESET 320-a may be configured to include 48 resource blocks or more. However, the indicated CORESET configuration may not be supported by the reduced bandwidth 310-a (e.g., a 5 MHz bandwidth at 15 kHz SCS that includes 25 resource blocks or less) configured for the first UE 115. That is, in some cases, a base station 105 may not utilize a same CORESET configuration for a reduced bandwidth 310-a as a CORESET configuration for a wider bandwidth 310-b.

To utilize the same CORESET configuration parameters in a MIB for configuring CORESETs 320 in reduced bandwidths 310-a and other bandwidths 310-b, a base station 105 as described herein may configure CORESETs 320 according to a subset of the index values provided in Table 2. In other words, if the base station 105 supports communications with at least one UE 115 that supports the reduced bandwidth 310-a, the base station 105 may utilize the subset of index values that map to CORESET configurations including 24 resource blocks or less (e.g., index values zero through five in Table 2). The first UE 115 may be configured to support the subset of index values, and the first UE 115 may not support larger index values. The first UE 115 may not expect to receive the CORESET configuration for the CORESET 320-b, in which the number of the resource blocks may be larger than a number of resource blocks supported by the first UE 115. In such cases, the CORESET 320-b may not be configured for a UE 115 in the network because the index value of 10 corresponds to a configuration of 48 resource blocks and is not included in the subset. Thus, the second UE 115 may be configured with another CORESET 320 that includes 24 resource blocks or less, irrespective of the size of the bandwidth 310-b supported by the second UE 115.

By utilizing the subset of index values instead of all of the index values, the base station 105 may reuse a CORESET configuration parameter within a MIB for configuring multiple types of UEs 115 that support multiple different bandwidth sizes. Such configuration techniques may provide for reduced overhead, improved coordination between devices, and more efficient utilization of communication resources.

Figure 4:
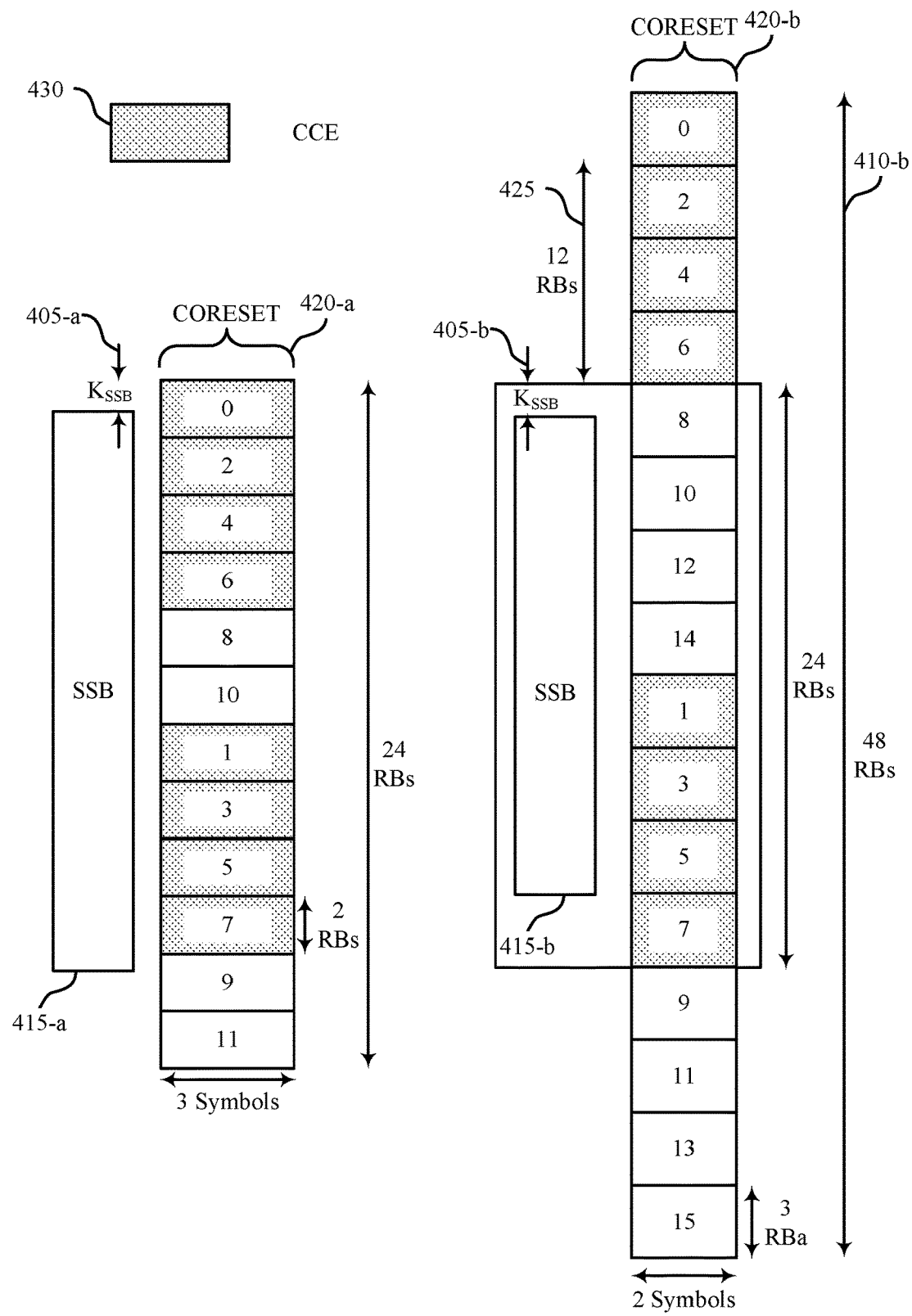
FIG. 4 illustrates an example of a resource configuration that supports CORESET configuration for reduced bandwidth UEs in accordance with aspects of the present disclosure.

FIG. 4 illustrates an example of a resource configuration 400 that supports CORESET configuration for reduced bandwidth UEs in accordance with aspects of the present disclosure. In some examples, the resource configuration 400 may represent an example of the resource configuration 300 described with reference to FIG. 3. For example, the resource configuration 400 may illustrate an example configuration of symbols and resource blocks within a CORESET 420-a and a CORESET 420-b and with respect to SSBs 415-a and 415-b that configure the respective CORESETs 420. The resource configuration 400 may represent a configuration of resources according to a 30 kHz SCS.

As described with reference to FIG. 3, the CCEs 430 may be mapped to REGs according to an interleaved or non-interleaved REG to CCE mapping pattern. An aggregation level for a CORESET 420 may indicate a quantity of CCEs 430 within the CORESET 420, and a quantity of resource blocks within each CCE 430 may vary. In the example of FIG. 4, the CCEs 430 in the CORESET 420-a may each include two resource blocks and the CCEs 430 in the CORESET 420-b may each include three resource blocks. In the example of FIG. 4, the CORESETs 420-a and 420-b may each be configured with an aggregation level of eight and include two control channel candidates, which may be based on a configured mapping between aggregation levels and quantities of control channel candidates, as described with reference to FIG. 3.

The CORESET 420-a may be an example of a CORESET 420 that may be supported by a first UE 115 that supports a reduced bandwidth 410-a. The first UE 115 and the reduced bandwidth 410-a may be examples of the first UE 115 and the reduced bandwidth 310-a as described with reference to FIG. 3. Although the reduced bandwidth 410-a is illustrated including 24 resource blocks, the reduced bandwidth 410-a for a first type of UE 115 may include any quantity of resource blocks (e.g., 24 resource blocks or less in a 10 MHz bandwidth for 30 kHz SCS, as described with reference to FIG. 2). The CORESET 420-b may be an example CORESET 420 for a second UE 115 that supports a bandwidth 410-b that is greater than the reduced bandwidth 410-a. The second UE 115 and the bandwidth 410-b may represent examples of the second UE 115 and the bandwidth 310-b, as described with reference to FIG. 3.

The first and second UEs 115 may receive an indication of configurations for the CORESET 420-a and the CORE- SET 420-*b* via a first MIB within the SSB 415-*a* and a second MIB within the SSB 415-*b*, respectively. The SSBs 415-*a* and 415-*b* may be examples of the SSBs 215 described with reference to FIG. 2. For example, each SSB 415 may occupy 20 resource blocks in the frequency domain. Each MIB may include an SSB frequency offset parameter that may indicate a frequency offset 405 for the SSB 415 (e.g., frequency offsets 405-*a* and 405-*b*). As described with reference to FIG. 3, each MIB may additionally or alternatively include a quantity of bits (e.g., four bits within a parameter, such as the pdcch-ConfigSIB1 parameter provided in Table 1) to indicate a configuration of symbols and resource blocks for a CORESET 420. A value of the bits may map to one of a set of indices corresponding to a set of possible configurations for a CORESET 420. Table 3 provides an example set of configurations for symbols and resource blocks in a CORESET 420 (e.g., a CORESET #0) at 30 kHz SCS.

TABLE 3

CORESET Resource Block and Symbol Configurations for 30 kHz SCS

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 1 |
| 2 | 1 | 24 | 2 | 2 |
| 3 | 1 | 24 | 2 | 3 |
| 4 | 1 | 24 | 2 | 4 |
| 5 | 1 | 24 | 3 | 0 |
| 6 | 1 | 24 | 3 | 1 |
| 7 | 1 | 24 | 3 | 2 |
| 8 | 1 | 24 | 3 | 3 |
| 9 | 1 | 24 | 3 | 4 |
| 10 | 1 | 48 | 1 | 12 |
| 11 | 1 | 48 | 1 | 14 |
| 12 | 1 | 48 | 1 | 16 |
| 13 | 1 | 48 | 2 | 12 |
| 14 | 1 | 48 | 2 | 14 |
| 15 | 1 | 48 | 2 | 16 |

Each value of the bits in the indicated configuration may map to a respective index in Table 3. In the example of FIG. 4, the CORESET 420-*a* may be configured according to the index zero, and the CORESET 420-*b* may be configured according to the index 13. That is, the first UE 115 may decode a CORESET configuration within the SSB 415-*a* and determine the CORESET configuration bits are set to zero. The first UE 115 may thereby determine, based on the mapping provided in Table 3, that there are 24 resource blocks in the CORESET 420-*a*, the CORESET 420-*a* occupies two symbols, and an offset 425 between the SSB 415-*a* and the CORESET 420-*a* is zero resource blocks. The second UE 115 may decode a CORESET configuration within the SSB 415-*b* and determine the CORESET configuration bits are set to 13. The second UE 115 may thereby determine, based on the mapping provided in Table 3, that there are 48 resource blocks in the CORESET 420-*b*, the CORESET 420-*b* occupies two symbols, and an offset 425 between the SSB 415-*b* and the CORESET 420-*b* is 12 resource blocks. It is to be understood that a CORESET configuration may be indicated via any quantity of bits that may map to any quantity of possible CORESET configurations for 30 kHz SCS, including symbol and resource block configurations that are the same as or different than the configurations provided in Table 3.

In some cases, a CORESET configuration for the first UE 115 that supports the reduced bandwidth 410-*a* may map to an index value of 10 or greater for the 30 kHz SCS, such that the CORESET 420-*a* may be configured to include 48 resource blocks or more. However, the indicated CORESET configuration may not be supported by the reduced bandwidth 410-*a* (e.g., a 10 MHz bandwidth at 30 kHz SCS that includes 24 resource blocks or less) configured for the first UE 115. That is, in some cases, a base station 105 may not utilize a same CORESET configuration for a reduced bandwidth 410-*a* as a CORESET configuration for a wider bandwidth 410-*b*.

To utilize the same CORESET configuration parameters in a MIB for configuring CORESETs 420 in reduced bandwidths 410-*a* and other bandwidths 410-*b*, a base station 105 as described herein may configure CORESETs 420 according to a subset of the index values provided in Table 3. In other words, if the base station 105 supports communications with at least one UE 115 that supports the reduced bandwidth 410-*a*, the base station 105 may utilize the subset of index values that map to CORESET configurations including 24 resource blocks or less (e.g., index values zero through ten in Table 3). The first UE 115 may be configured to support the subset of index values, and the first UE 115 may not support larger index values. In such cases, the CORESET 420-*b* may not be configured for a UE 115 in the network because the index value of 13 corresponds to a configuration of 48 resource blocks and is not included in the subset. Thus, the second UE 115 may be configured with another CORESET 420 that includes 24 resource blocks or less, irrespective of the size of the bandwidth 410-*b* supported by the second UE 115.

By utilizing the subset of index values instead of all of the index values, the base station 105 may reuse a CORESET configuration parameter within a MIB for configuring multiple types of UEs 115 that support multiple different bandwidth sizes. Such configuration techniques may provide for reduced overhead, improved coordination between devices, and more efficient utilization of communication resources.

Figure 5:
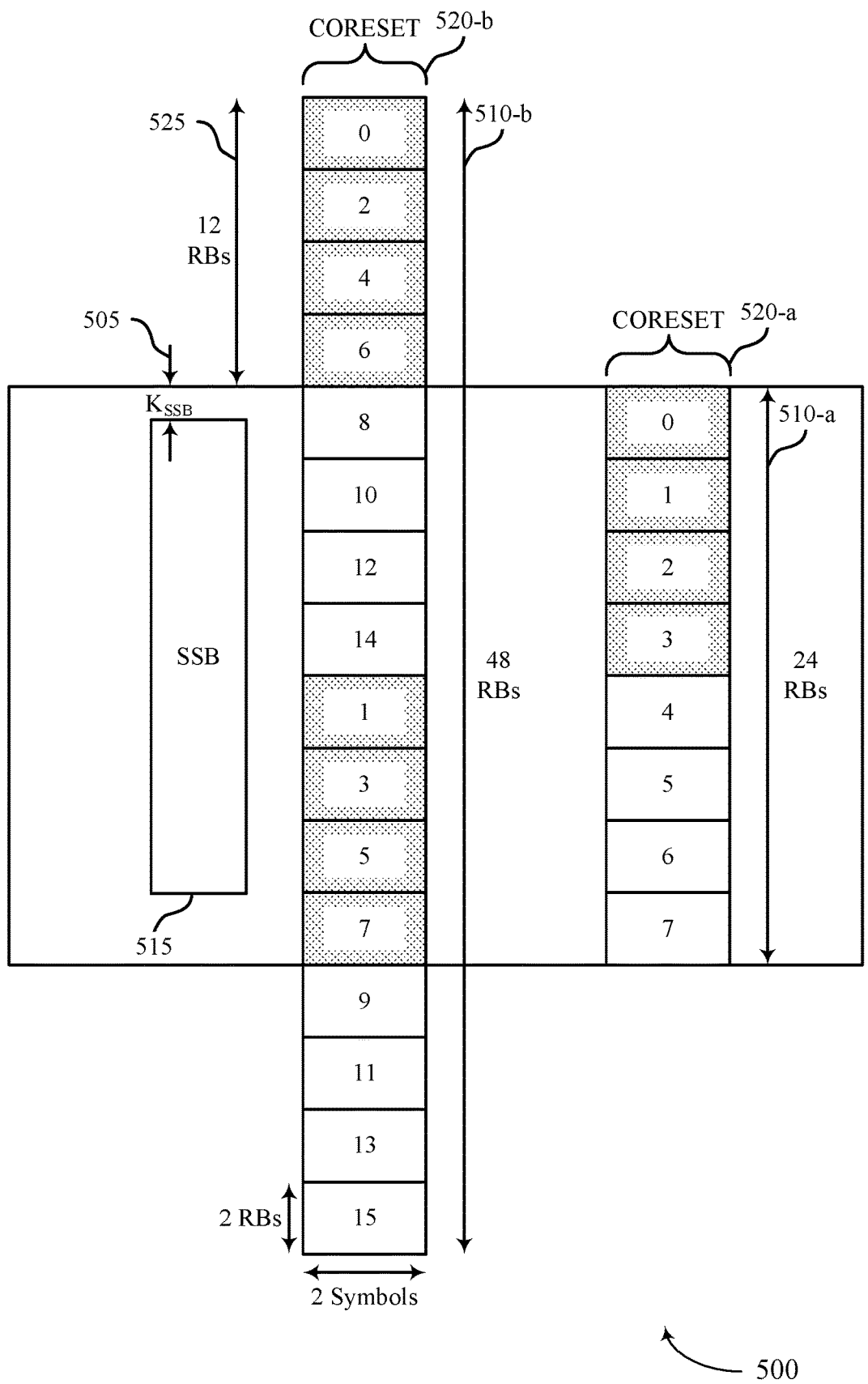
FIG. 5 illustrates an example of a resource configuration that supports CORESET configuration for reduced bandwidth UEs in accordance with aspects of the present disclosure.

FIG. 5 illustrates an example of a resource configuration 500 that supports CORESET configuration for reduced bandwidth UEs in accordance with aspects of the present disclosure. The resource configuration 500 may be an example of the resource configurations 300 and 400 described with reference to FIGS. 3 and 4. For example, the resource configuration 500 may illustrate a configuration of symbols and resource blocks for a CORESET 520-*a* and a CORESET 520-*b* with respect to an SSB 515 that configures the CORESETs 520-*a* and 520-*b*. Each CORESET 520 may be an initial CORESET 520, such as a CORESET zero. In some examples, a base station 105 or some other network entity may configure CCEs 530 within each CORESET 520 according to an interleaved or non-interleaved mapping pattern based on a supported bandwidth 510 to reduce collisions between CCEs 530 for different UE types.

As described with reference to FIGS. 2-4, the SSB 515 may include 20 resource blocks. The SSB 515 may transport a MIB to one or more UEs 115 via a PBCH. The MIB may indicate configuration information, as provided with respect to Table 1. In some examples, the MIB may include a field to indicate a frequency offset 505 (e.g., $K_{SSB}$) for the SSB 515. The MIB may additionally or alternatively convey a configuration for an initial CORESET 520. The configuration may include a quantity of bits that may point to one of a set of indices to a set of possible CORESET configurations. Examples of the CORESET configurations for different SCS values are provided with respect to Tables 2 and 3.

The CORESETs 520-a and 520-b may be configured according to a 30 kHz SCS. Accordingly, a base station 105 may configure the CORESETs 520-a, 520-b, or both by pointing to an index in Table 3, or some other set of possible CORESET configurations at 30 kHz SCS. For example, the CORESET 520-b may correspond to the configuration having index 13 in Table 3, which may be the same as the configuration for the CORESET 420-b described with reference to FIG. 4.

In the example of FIG. 5, a base station 105 or some other network entity may configure each UE 115 in the network with any CORESET configuration. That is, a value of the configuration bits in a MIB may map to any of the indices in Tables 2 or 3 (e.g., depending on the SCS) irrespective of a type of UE 115 or a supported bandwidth 510. A first type of UE 115 that supports a reduced bandwidth 510-a (e.g., a 5 MHz bandwidth for 15 kHz SCS, a 10 MHz bandwidth for 30 kHz SCS, or some other bandwidth) may be configured to assume that a CORESET configuration for the UE 115 includes 24 resource blocks irrespective of the indicated CORESET configuration. That is, the first type of UE 115 may assume the CORESET 520 is configured to include a same quantity of symbols as the symbols associated with the indicated configuration, but the UE 115 may ignore the configured quantity of resource blocks, the configured SSB offset 525, or both.

For example, the SSB 515 may convey a MIB that indicates a CORESET configuration index value of 13. A second UE 115 that supports a bandwidth 510-b that is greater than the reduced bandwidth 510-a may determine, based on a mapping between the index value of 13 and the configurations provided in Table 3, that the CORESET 520-b includes 48 resource blocks, occupies two symbols, and corresponds to an SSB offset 525 of 12 resource blocks. A first UE 115 that supports the reduced bandwidth 510-a may receive the CORESET configuration index value of 13 and assume that the CORESET 520-a configured for the first UE 115 includes 24 resource blocks, occupies two symbols, and does not correspond to an SSB offset 525. The UE 115 may ignore the indicated SSB offset 525 because the SSB offset 525 may be larger than a difference between the reduced bandwidth 510-a and the size of the 20 resource blocks of SSB 515, such that an offset may not be supported.

Such CORESET configuration techniques may reduce overhead and provide for a base station 105 to share a CORESET configuration in a MIB for two or more UEs 115 corresponding to different UE types. In some cases, however, the base station 105 may configure each CORESET 520 (e.g., each CORESET #0) with an interleaved REG to CCE 530 mapping pattern. The interleaved mapping patterns may result in overlap, or collisions, between PDCCH candidates in each of the CORESET 520-a and PDCCH candidates in the CORESET 520-b.

To reduce a potential for PDCCH collisions, the base station 105 may configure the first UE 115 and other UEs 115 that support the reduced bandwidth 510-a (e.g., a 5 MHz bandwidth, a 10 MHz bandwidth, or some other reduced bandwidth 510-a) to assume non-interleaved mapping between REGs and CCEs 530, as illustrated in the CORESET 520-a in FIG. 5. That is, PDCCH candidates in the CORESET 520-a may use consecutive resource blocks instead of an interleaved pattern of resource blocks. The second UE 115 and other UEs 115 that support the bandwidth 510-b (e.g., 20 MHz bandwidth or greater) may be configured to monitor the CORESET 520-b and other CORESETs 520 assuming an interleaved REG to CCE 530 mapping. That is, the PDCCH candidates in the CORESET 520-b may use an interleaved pattern of resource blocks.

By configuring the CORESET 520-a with a non-interleaved mapping, the PDCCH candidates in the CORESET 520-a may not overlap with the PDCCH candidates in the CORESET 520-b, which may reduce collisions while supporting a shared configuration for the CORESETs 520. Although the CORESETS 520-a and 520-b are illustrated according to a 30 kHz SCS, it is to be understood that the non-interleaved mapping configuration for reduced bandwidths 510-a may be applied for any SCS value and for any CORESET configuration.

Figure 6A:
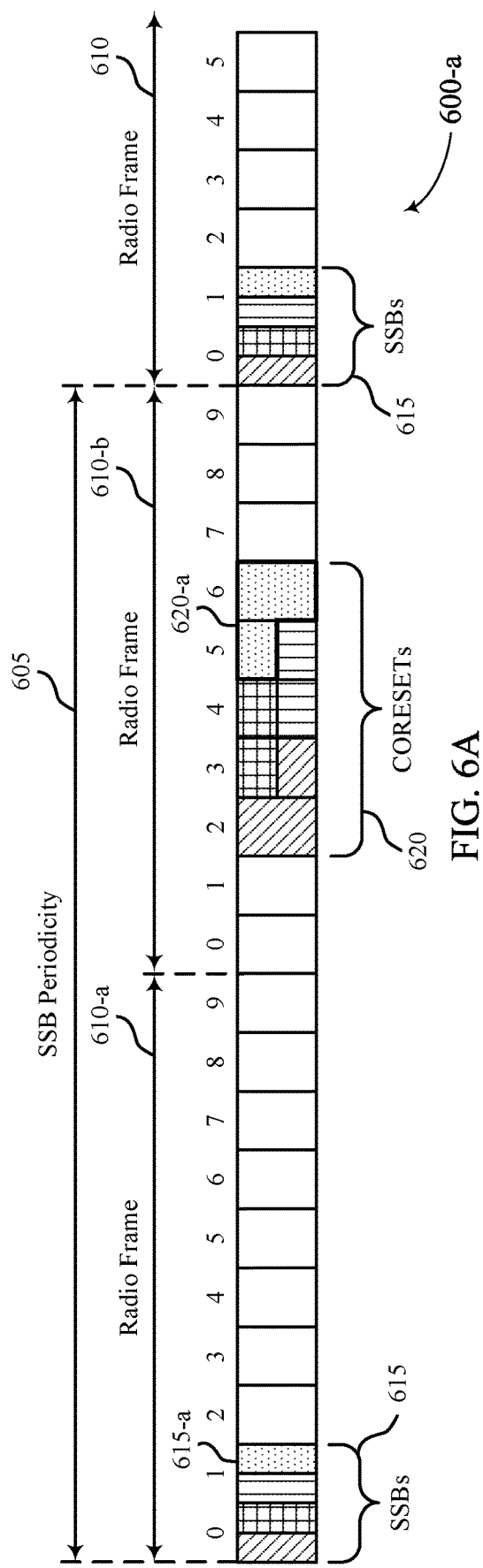
FIGS. 6A and 6B illustrate examples of control channel monitoring timelines that support CORESET configuration for reduced bandwidth UEs in accordance with aspects of the present disclosure.
Figure 6B:
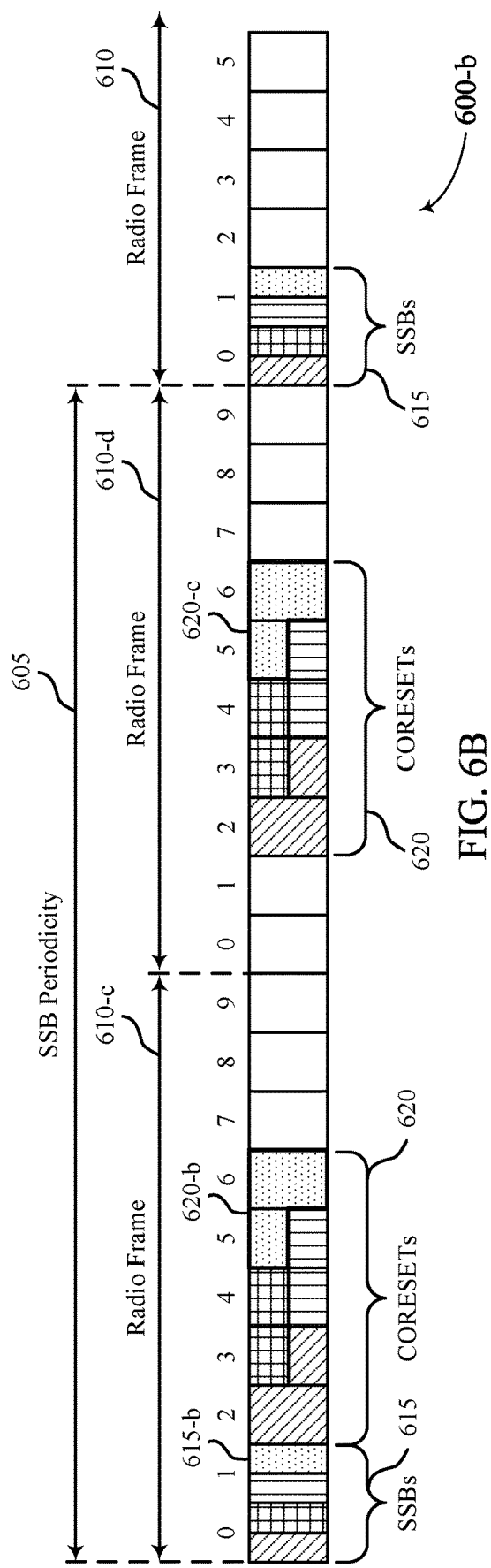

FIGS. 6A and 6B illustrate examples of control channel monitoring timelines 600-a and 600-b that support CORESET configuration for reduced bandwidth UEs in accordance with aspects of the present disclosure. The control channel monitoring timelines 600-a and 600-b may illustrate timelines for one or more UEs 115 to receive SSBs 615 and monitor corresponding CORESETs 620 configured by the SSBs 615 (e.g., a CORESET #0). The UEs 115 may, in some examples, monitor for and receive the SSBs 615 periodically. For example, the UEs 115 may each receive an SSB 615 according to an SSB periodicity 605. The SSB periodicity may correspond to a quantity of radio frames 610, or some other transmission time interval (TTI) (e.g., every two radio frames 610 or every 20 ms, or some other periodicity). Each SSB 615 may include a PBCH that carries a configuration for a corresponding CORESET 620, as described with respect to FIGS. 2-5.

The PBCH, or a MIB transmitted via the PBCH, may include a parameter (e.g., pdcch-ConfigSIB1) that indicates the configuration for the CORESET 620. The parameter may indicate a quantity of symbols and resource blocks included in the CORESET 620, as described with reference to FIGS. 3-5. The parameter may additionally or alternatively include a quantity of bits (e.g., four bits, or some other quantity of bits) to indicate a configuration for a PDCCH monitoring pattern for the CORESET 620. A value of the bits may index to a PDCCH monitoring pattern from a set of configured PDCCH monitoring patterns. An example set of configured PDCCH monitoring parameters is provided in Table 4.

TABLE 4

PDCCH Monitoring Parameters

| Index | O | Number of search space sets per slot | M | First symbol index |
|---|---|---|---|---|
| 0 | 0 | 1 | 1 | 0 |
| 1 | 0 | 2 | 1/2 | {0, if i is even}, {$N_{symb}^{CORESET}$, if i is odd} |
| 2 | 2 | 1 | 1 | 0 |
| 3 | 2 | 2 | 1/2 | {0, if i is even}, {$N_{symb}^{CORESET}$, if i is odd} |
| 4 | 5 | 1 | 1 | 0 |
| 5 | 5 | 2 | 1/2 | {0, if i is even}, {$N_{symb}^{CORESET}$, if i is odd} |
| 6 | 7 | 1 | 1 | 0 |
| 7 | 7 | 2 | 1/2 | {0, if i is even}, {$N_{symb}^{CORESET}$, if i is odd} |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |

TABLE 4-continued

PDCCH Monitoring Parameters

| Index | O | Number of search space sets per slot | M | First symbol index |
|---|---|---|---|---|
| 13 | 2 | 1 | 1 | 2 |
| 14 | 5 | 1 | 1 | 1 |
| 15 | 5 | 1 | 1 | 2 |

As provided in Table 4, each index value may correspond to a respective starting slot index of the CORESET 620 (e.g., O), a number of search space sets per slot, an indication of how CORESETs 620 corresponding to two different SSBs 615 may be overlapped (e.g., M), and a first symbol index of the CORESET 620. A UE 115 may determine a pattern for monitoring a CORESET 620 based on the index value received via the SSB 615. The UE 115 may monitor the CORESET 620 to obtain scheduling information for a SIB (e.g., SIB-1, which may be referred to as remaining minimum system information (RMSI)).

In some examples, an SSB 615 may schedule a first CORESET 620 for a first UE 115 that supports a reduced bandwidth and a second CORESET 620 for a second UE 115 that supports a wider bandwidth. In some cases, a PDCCH in a CORESET 620 that schedules SIB-1 (e.g., RMSI) may use a relatively high aggregation level. As such, scheduling two PDCCHs inside a same slot may be result in interference or increased overhead. Accordingly, techniques for scheduling separate PDCCHs in separate slots may be beneficial.

FIG. 6A illustrates a first control channel monitoring timeline 600-a. The control channel monitoring timeline 600-a may correspond to a first PDCCH monitoring pattern configuration for one or more UEs 115. For example, the first PDCCH monitoring pattern configuration may correspond to the index value two in Table 4. The one or more UEs 115 may include at least a first UE 115 that supports a reduced bandwidth and a second UE 115 that supports a bandwidth that is wider than the reduced bandwidth. The first and second bandwidths may be examples of reduced bandwidths and wider bandwidths, respectively, as described with reference to FIGS. 2-5.

In some cases, two slots may be supported for monitoring each CORESET 620 per SSB 615. For example, the SSB 615-a received in the radio frame 610-a may configure the CORESET 620-a, and a UE 115 may monitor for the CORESET 620-a in at least two candidate slots (e.g., the slots labeled 5 and 6) in the radio frame 610-b). In such cases, a base station may schedule a PDCCH for the UE 115 within one of the two slots.

A base station 105 as described herein may schedule two different PDCCHs in different slots for a single SSB 615. That is, if the SSB 615-a configures the CORESET 620-a for the first UE 115 and a second CORESET 620 for the second UE 115, the base station 105 will schedule the CORESET 620-a in the slot number five in the radio frame 610-b and schedule the second CORESET 620 in the slot number six in the radio frame 610-b, or vice versa, which may reduce overlap between PDCCHs for different bandwidths.

Accordingly, two CORESETS 620 that are configured for two different types of UEs 115 and that each correspond to a same SSB 615 may be scheduled in two different slots (e.g., up to a base station 105 implementation).

FIG. 6B illustrates a second control channel monitoring timeline 600-b. The control channel monitoring timeline 600-b may correspond to a second PDCCH monitoring pattern configuration for at least the first UE 115 and the second UE 115. In the example of FIG. 6B, a base station 105 may configure different PDCCH monitoring patterns for the first UE 115 and the second UE 115.

The base station 105 may configure the different PDCCH monitoring patterns by configuring the first UE 115 and the second UE 115 to monitor alternating radio frames 610. That is, if the second UE 115 is configured to monitor every even radio frame 610 (e.g., a current monitoring pattern is configured for even radio frames 610), the base station 105 may configure the first UE 115 (e.g., a UE 115 that supports the reduced bandwidth) to monitor every odd radio frame 610, or vice versa. For example, the first UE 115 may monitor the set of CORESETs 620 in the radio frame 610-c, and the second UE 115 may monitor the set of CORESETs 620 in the radio frame 610-d. In one example, the SSB 615-b may configure the CORESET 620-b for the first UE 115 and the CORESET 620-c for the second UE 115. The first UE 115 may monitor slot numbers five and six in the radio frame 610-c for the CORESET 620-b, and the second UE 115 may monitor slot numbers five and six in the radio frame 610-d for the CORESET 620-c.

In one example, the base station 105 may configure the different PDCCH monitoring patterns by configuring the first UE 115 to interpret the PDCCH monitoring pattern configuration parameters differently than the second UE 115. For example, an SFN for a respective radio frame 610 may be determined based on the i, M, and O parameters provided in Table 4. The first UE 115 may be configured to determine an SFN corresponding to odd radio frames 610.

In another example, a second set of PDCCH monitoring configurations may be configured for the first UE 115 and the reduced bandwidth. The first UE 115 may be configured to receive an index value for the PDCCH monitoring pattern configuration and look up the index value in the second set of PDCCH monitoring pattern configurations, such that a PDCCH monitoring pattern for the first UE 115 is different from a PDCCH monitoring pattern for the second UE 115. A base station 105 as described herein may thereby configure different PDCCH monitoring patterns for UEs 115 that support a reduced bandwidth and UEs 115 that support a wider bandwidth such that the UEs 115 may monitor separate slots, radio frames, or both for respective CORESETs 620.

The UEs 115 may monitor the CORESETs 620 to obtain control information that schedules a system information message, such as a SIB-1 message. The SIB-1 message may, in some examples, be referred to as RMSI. The control information may be conveyed via DCI scrambled by a system information RNTI (SI-RNTI). An example DCI format (e.g., DCI 1_0) for scheduling a SIB-1 is provided in Table 5.

TABLE 5

Example Format for DCI Scrambled by SI-RNTI

| | Information Field | Number of Bits |
|---|---|---|
| DCI 1_0 Scrambled by SI-RNTI | Frequency Domain Resource Allocation (FDRA) | Depending on bandwidth part (BWP) Size |
| | Time Domain Resource Allocation (TDRA) | 4 |
| | Virtual Resource Block (VRB)-to-PRB Mapping | 1 |

TABLE 5-continued

Example Format for DCI Scrambled by SI-RNTI

| Information Field | Number of Bits |
|---|---|
| Modulation and Coding Scheme (MCS) | 5 |
| Redundancy Version | 2 |
| System Information Indicator | 1 |
| Reserved Bits | 15 |

As provided in Table 5, the DCI may configure an FDRA, TRDA, VRB-to-PRB mapping, MCS, redundancy version, and a system information indicator for the SIB-1. The DCI may additionally or alternatively include a set of reserved bits. In the example of FIG. 6, a first DCI that schedules a SIB for the first UE 115 may be different than a second DCI that schedules a SIB for the second UE 115. For example, the first DCI may schedule a SIB PDSCH using a reduced bandwidth (e.g., 5 MHz or 10 MHz), and the second DCI may schedule a SIB PDSCH using a wider bandwidth (e.g., 20 MHz or more). In some cases, however, the first and second UEs 115 may not be able to differentiate the first DCI from the second DCI.

As described herein, one or more DCI configurations may provide for the first and second UEs 115 to differentiate a DCI that schedules a SIB for the reduced bandwidth from a DCI that schedules a SIB for the wider bandwidth. In one example, the DCI may be scrambled using a different RNTI depending on the supported bandwidth. For example, DCI for the second UE 115 supporting the wider bandwidth may be scrambled using an SI-RNTI, and DCI for the first UE 115 supporting the reduced bandwidth may be scrambled using a reduced bandwidth SI-RNTI (e.g., SI-RNTI-RB). The first and second UEs 115 may identify which DCI includes scheduling information relevant to the respective UE 115 based on the RNTI. In another example, a first DCI size (e.g., a size of DCI format 1_0) may be configured for the reduced bandwidth and a second DCI size may be configured for wider bandwidths. The first DCI size may, in some examples, be smaller than the second DCI size. Accordingly, the first and second UEs 115 may determine whether the DCI includes scheduling information relevant to the respective UE 115 based on the size of the DCI.

In another example, a set of reserved bits in the DCI format may be used to convey a SIB-1 configuration for the reduced bandwidth. As provided in Table 5, the DCI may include some quantity of reserved bits (e.g., 15 bits, or some other quantity). Table 6 provides an example configuration of the reserved bits for configuration of SIB-1 for a reduced bandwidth (e.g., for superlight UEs 115).

TABLE 6

Reserved Bits in DCI Scrambled by SI-RNTI

| Information Field | Number of Bits |
|---|---|
| Indication | 1 |
| FDRA | 6 |
| TDRA | 4 |
| VRB-to-PRB Mapping | 0 (same) |
| MCS | 4 (up to 16 QAM) |
| Redundancy Version | 0 (same) |
| System Information Indicator | 0 |

As provided in the example reserved bit configuration in Table 6, the reserved bits in the DCI may be configured to convey similar scheduling information to the scheduling information conveyed via the other bits of the DCI as provided in Table 5. However, the scheduling information conveyed via the reserved bits may schedule a SIB-1 for the first UE 115 and other UEs 115 that support the reduced bandwidth. The reserved bits may, in some examples, not include an indication of a VRB-to-PRB mapping, a redundancy version, or a system information indicator because these parameters may be the same for the reduced bandwidth as for wider bandwidths (e.g., the parameters may be reused). The reserved bits may convey a different FDRA, TDRA, and MCS for the reduced bandwidth. The MCS for the reduced bandwidth may be conveyed via four bits or less, as the reduced bandwidth may support a reduced quadrature amplitude modulation (QAM) (e.g., 16 QAM or less).

The first UE 115 may be configured to decode the reserved bits in the DCI to obtain scheduling information. The second UE 115 may be configured to ignore the reserved bits and decode the remaining bits in the DCI to obtain scheduling information. Accordingly, the reserved bits may be used for PDCCH differentiation between scheduling information for the reduced bandwidth and scheduling information for other, wider bandwidths 210.

A first UE 115 that supports a reduced bandwidth and a second UE 115 that supports a wider bandwidth may thereby be configured with separate PDCCH monitoring patterns to provide for differentiation between initial CORESETs 620 and control messages transmitted via the CORESETS 620.

Figure 7:
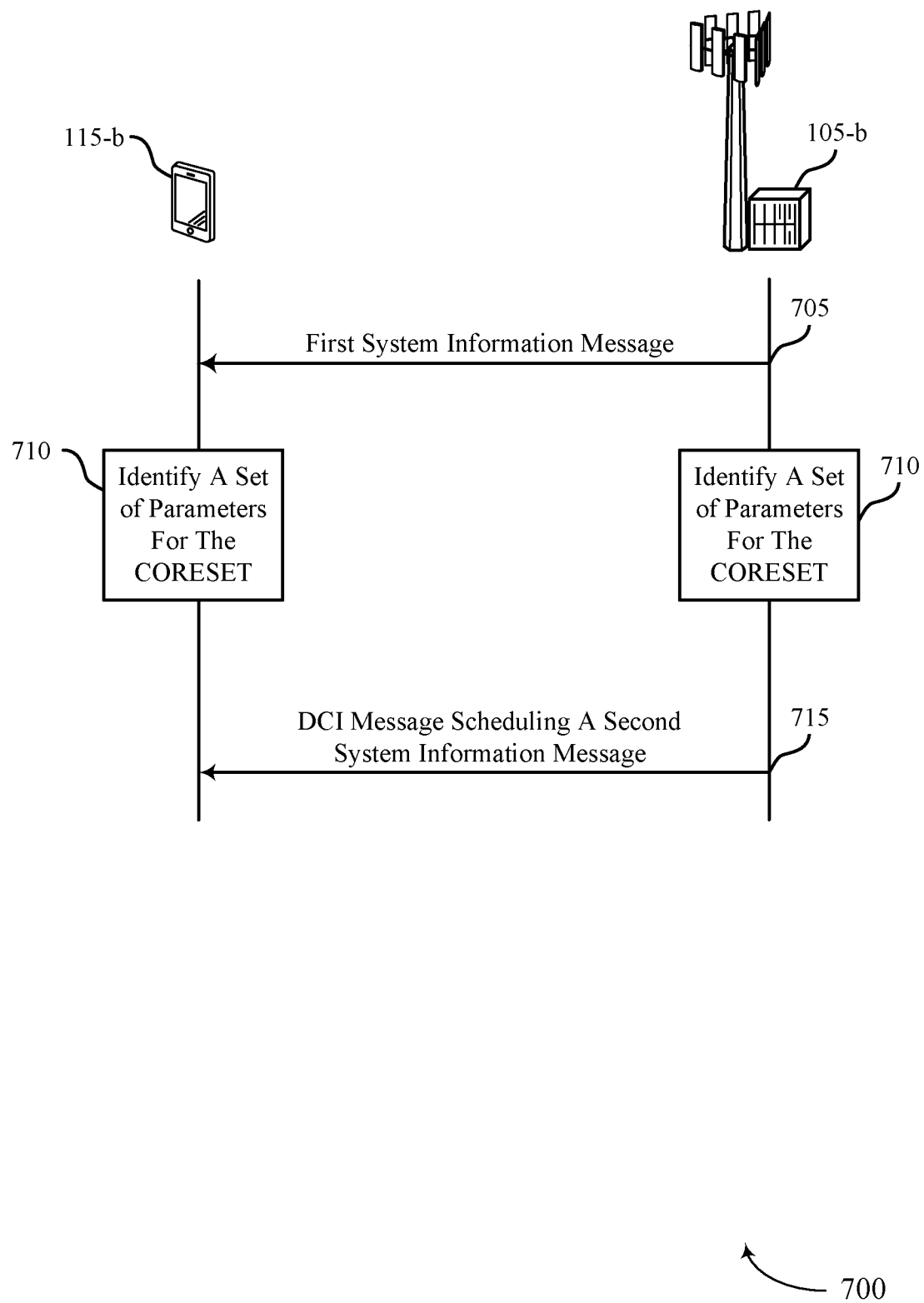
FIG. 7 illustrates an example of a process flow that supports CORESET configuration for reduced bandwidth UEs in accordance with aspects of the present disclosure.

FIG. 7 illustrates an example of a process flow 700 that supports CORESET configuration for reduced bandwidth UEs in accordance with aspects of the present disclosure. The process flow 700 may implement aspects of the wireless communications systems 100 and 200 or may be implemented by aspects of the wireless communications systems 100 and 200 as described with reference to FIGS. 1 and 2, respectively. For example, the process flow 700 may implement or be implemented by a base station 105-b and a UE 115-b, which may be examples of a base station 105 and a UE 115 as described with reference to FIGS. 1 through 6. In the following description of the process flow 700, the operations between the base station 105-b and the UE 115-b may be performed in different orders or at different times. Some operations may also be left out of the process flow 700, or other operations may be added. Although the base station 105-b and the UE 115-b are shown performing the operations of the process flow 700, some aspects of some operations may also be performed by one or more other wireless devices.

At 705, the base station 105-b may transmit a first system information message to the UE 115-b. The first system information message may include an indication of a resource configuration for a CORESET, the CORESET including a common search space for a DCI message that schedules a second system information message.

At 710, the base station 105-b, the UE 115-b, or both may identify a set of parameters from a first plurality of sets of parameters for the CORESET based on the indication received in the first system information message and the UE 115-b being a first type of UE 115. The first plurality of sets of parameters may be different from a second plurality of sets of parameters for the CORESET associated with a second type of UE 115 different from the first type of UE 115.

At 715, the base station 105-b may transmit the DCI message scheduling the second system information message to the UE 115-b. The base station 105-b may transmit and the UE 115-*b* may receive the DCI message in the CORESET according to the identified set of parameters.

Figure 8:
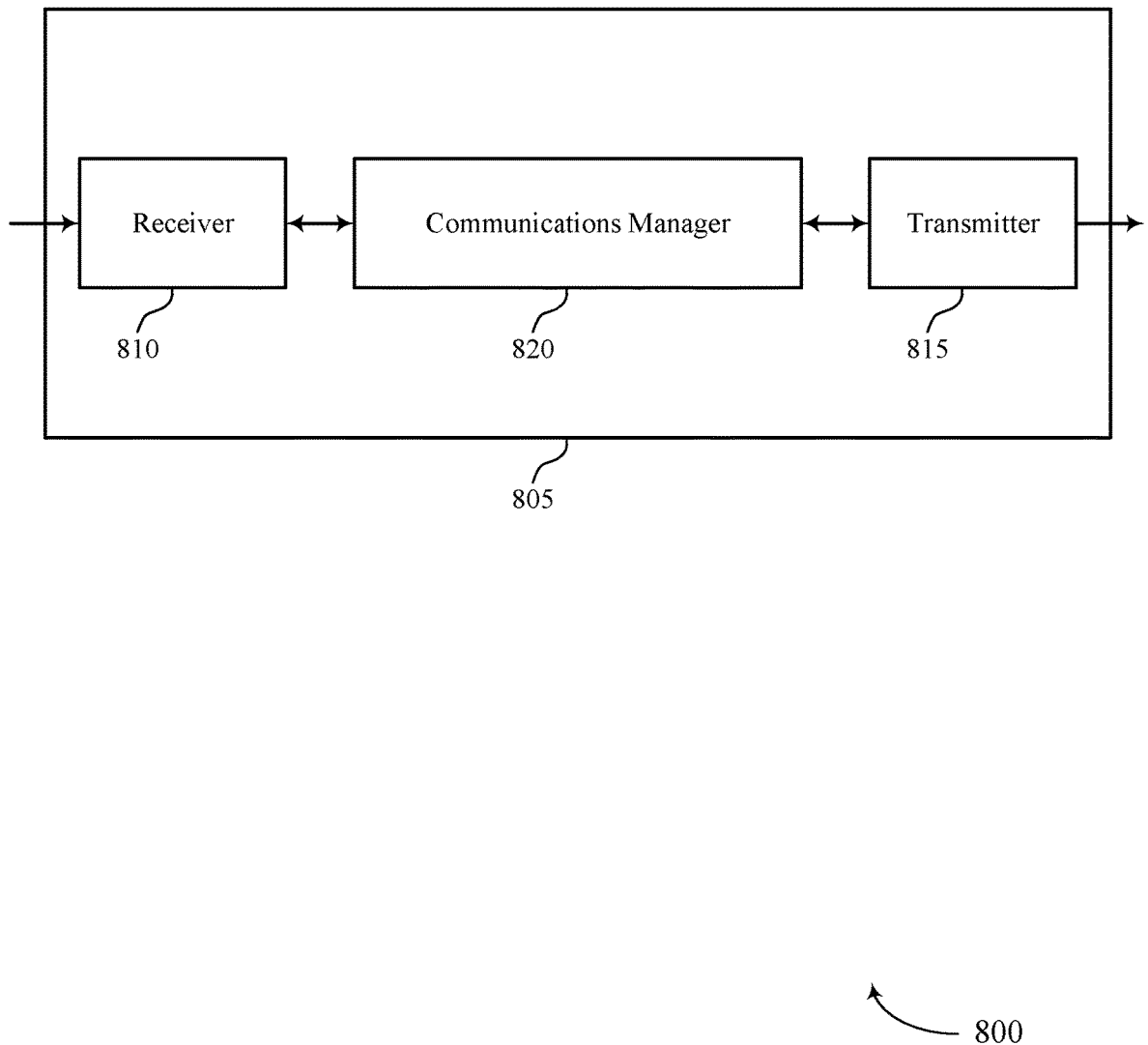
FIGS. 8 and 9 show block diagrams of devices that support CORESET configuration for reduced bandwidth UEs in accordance with aspects of the present disclosure.

FIG. 8 shows a block diagram 800 of a device 805 that supports CORESET configuration for reduced bandwidth UEs in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to CORESET configuration for reduced bandwidth UEs). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to CORESET configuration for reduced bandwidth UEs). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of CORESET configuration for reduced bandwidth UEs as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. For example, the communications manager 820 may be configured as or otherwise support a means for receiving a first system information message from a base station, the first system information message including an indication of a resource configuration for a CORESET, the CORESET including a common search space for a DCI message that schedules a second system information message. The communications manager 820 may be configured as or otherwise support a means for identifying a set of parameters from a first set of multiple sets of parameters for the CORESET based on the indication received in the first system information message and the UE being a first type of UE, the first set of multiple sets of parameters different from a second set of multiple sets of parameters for the CORESET associated with a second type of UE different from the first type of UE. The communications manager 820 may be configured as or otherwise support a means for receiving, in the CORESET according to the identified set of parameters, the DCI message scheduling the second system information message.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing, reduced power consumption, and more efficient utilization of communication resources. By supporting a reduced operating bandwidth, the processor of the device 805 may reduce processing and power consumption as compared with a device that supports a larger operating bandwidth. The device 805 may receive a configuration for a CORESET zero via a configuration that is shared with another device that supports the larger operating bandwidth, which may provide for more efficient utilization of communication resources as compared with devices 805 that do not share CORESET configurations. Additionally or alternatively, by supporting a different PDCCH monitoring pattern, the processor of the device may experience less interference than if the PDCCH monitoring pattern is the same for the device 805 and another type of device, which may reduce processing and latency.

Figure 9:
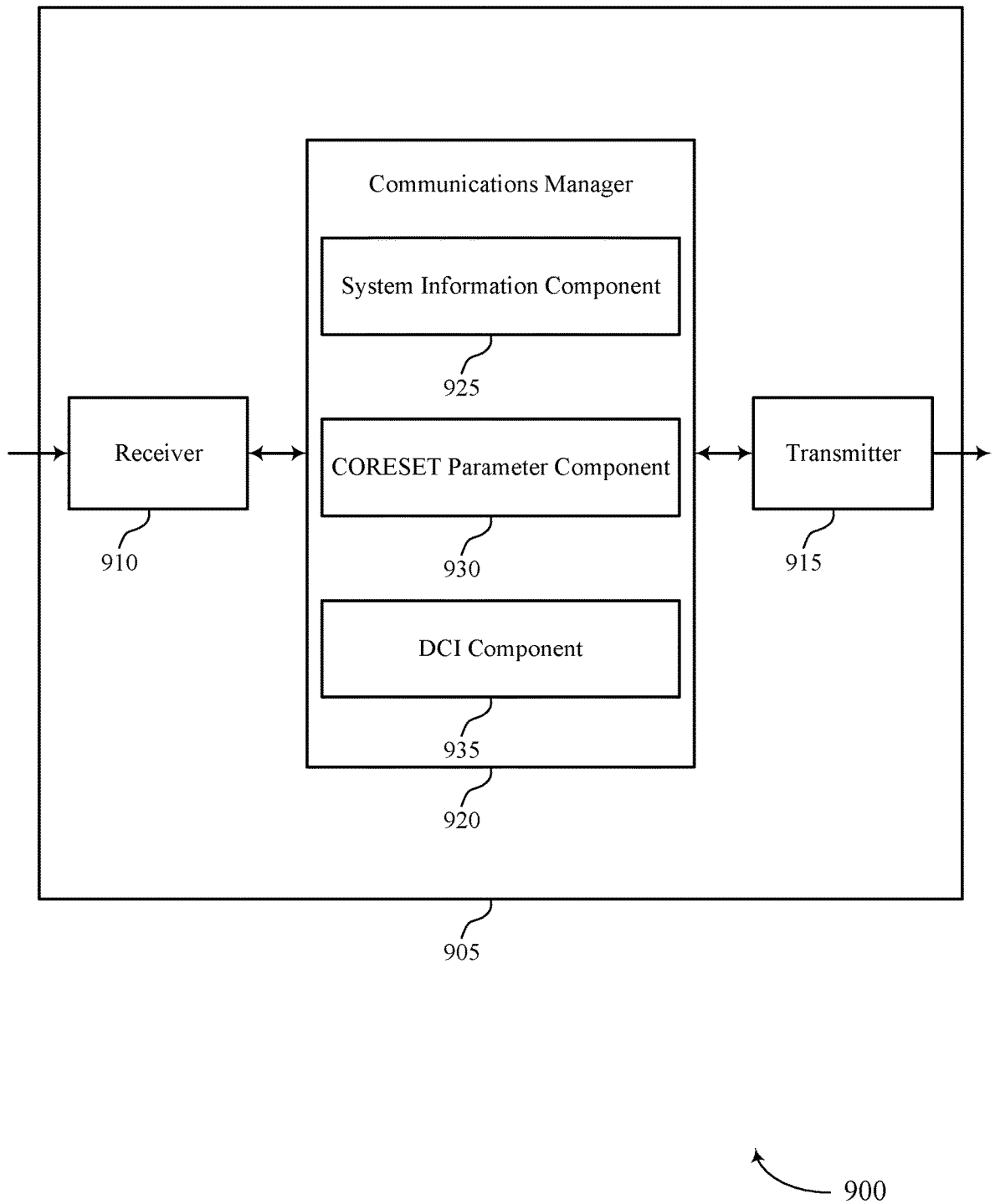

FIG. 9 shows a block diagram 900 of a device 905 that supports CORESET configuration for reduced bandwidth UEs in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to CORESET configuration for reduced bandwidth UEs). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to CORESET configuration for reduced bandwidth UEs). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of CORESET configuration for reduced bandwidth UEs as described herein. For example, the communications manager 920 may include a system information component 925, a CORESET parameter component 930, a DCI component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. The system information component 925 may be configured as or otherwise support a means for receiving a first system information message from a base station, the first system information message including an indication of a resource configuration for a CORESET, the CORESET including a common search space for a DCI message that schedules a second system information message. The CORESET parameter component 930 may be configured as or otherwise support a means for identifying a set of parameters from a first set of multiple sets of parameters for the CORESET based on the indication received in the first system information message and the UE being a first type of UE, the first set of multiple sets of parameters different from a second set of multiple sets of parameters for the CORESET associated with a second type of UE different from the first type of UE. The DCI component 935 may be configured as or otherwise support a means for receiving, in the CORESET according to the identified set of parameters, the DCI message scheduling the second system information message.

Figure 10:
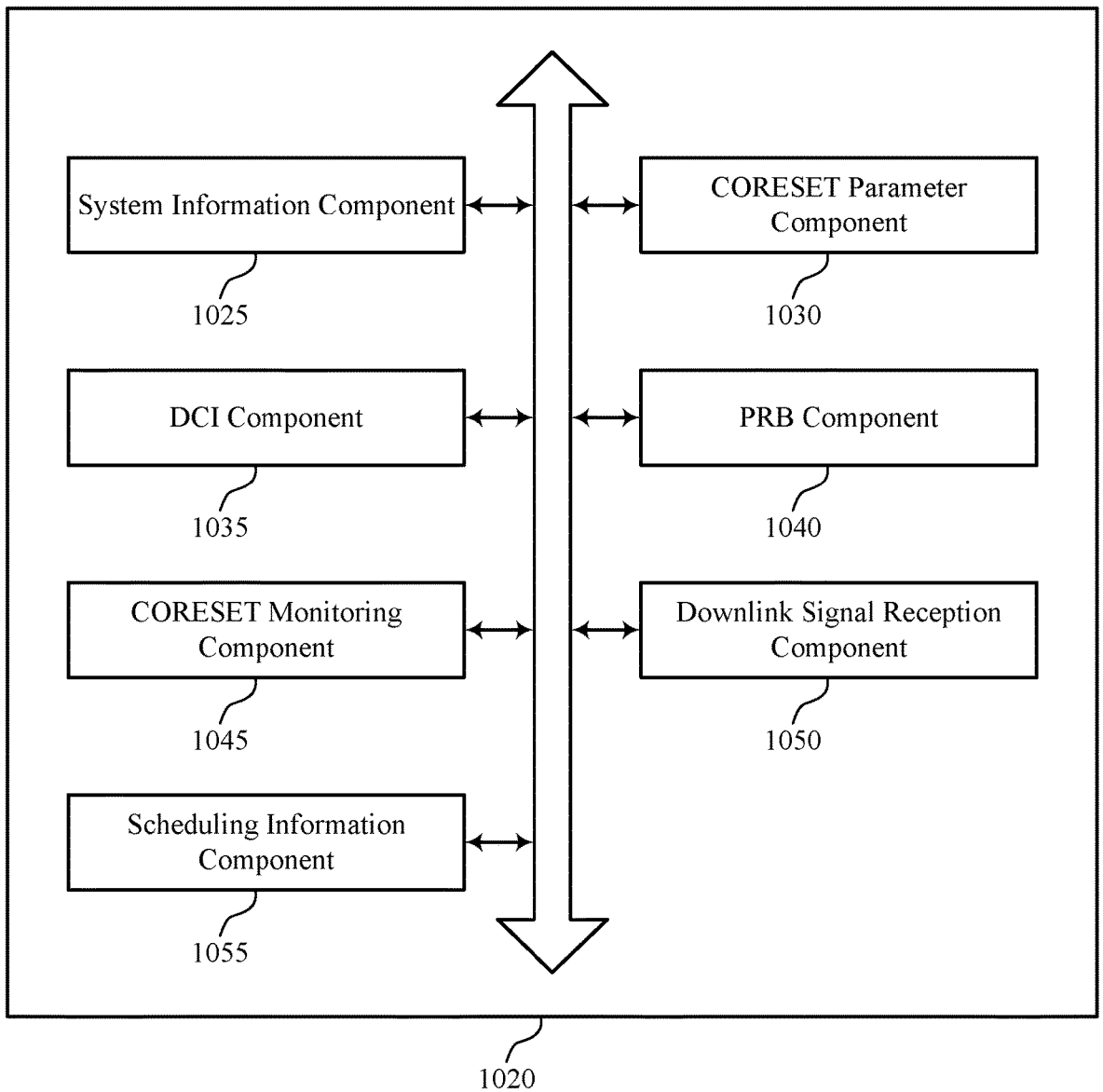
FIG. 10 shows a block diagram of a communications manager that supports CORESET configuration for reduced bandwidth UEs in accordance with aspects of the present disclosure.

FIG. 10 shows a block diagram 1000 of a communications manager 1020 that supports CORESET configuration for reduced bandwidth UEs in accordance with aspects of the present disclosure. The communications manager 1020 may be an example of aspects of a communications manager 820, a communications manager 920, or both, as described herein. The communications manager 1020, or various components thereof, may be an example of means for performing various aspects of CORESET configuration for reduced bandwidth UEs as described herein. For example, the communications manager 1020 may include a system information component 1025, a CORESET parameter component 1030, a DCI component 1035, a PRB component 1040, a CORESET monitoring component 1045, a downlink signal reception component 1050, a scheduling information component 1055, or any combination thereof. Each of these components may communicate, directly or indirectly, with one another (e.g., via one or more buses).

The communications manager 1020 may support wireless communication at a UE in accordance with examples as disclosed herein. The system information component 1025 may be configured as or otherwise support a means for receiving a first system information message from a base station, the first system information message including an indication of a resource configuration for a CORESET, the CORESET including a common search space for a DCI message that schedules a second system information message. The CORESET parameter component 1030 may be configured as or otherwise support a means for identifying a set of parameters from a first set of multiple sets of parameters for the CORESET based on the indication received in the first system information message and the UE being a first type of UE, the first set of multiple sets of parameters different from a second set of multiple sets of parameters for the CORESET associated with a second type of UE different from the first type of UE. The DCI component 1035 may be configured as or otherwise support a means for receiving, in the CORESET according to the identified set of parameters, the DCI message scheduling the second system information message.

In some examples, to support identifying the set of parameters from the first set of multiple sets of parameters, the PRB component 1040 may be configured as or otherwise support a means for identifying a first quantity of PRBs for the CORESET based on the UE being the first type of UE, where the indication of the resource configuration for the CORESET is indicative of a second quantity of PRBs different from the first quantity of PRB s.

In some examples, the PRB component 1040 may be configured as or otherwise support a means for identifying, based on the UE being the first type of UE, that PRBs of the CORESET are sequential, where CORESETs including common search spaces configured for the second system information message are interleaved for the second type of UE.

In some examples, the CORESET monitoring component 1045 may be configured as or otherwise support a means for monitoring the CORESET for the DCI message in a set of slots according to the identified set of parameters, the CORESET monitored in each slot of the set of slots by both at least one of the first type of UE and at least one of the second type of UE, where the DCI message is received based on the monitoring.

In some examples, to support identifying the set of parameters from the first set of multiple sets of parameters, the CORESET monitoring component 1045 may be configured as or otherwise support a means for identifying a first set of slots in which to monitor the CORESET based on the UE being the first type of UE, a second set of slots configured for the second type of UE to monitor the CORESET, where the first set of slots is different from the second set of slots.

In some examples, to support receiving the DCI message, the downlink signal reception component 1050 may be configured as or otherwise support a means for receiving a downlink signal in the CORESET according to the identified set of parameters. In some examples, to support receiving the DCI message, the DCI component 1035 may be configured as or otherwise support a means for decoding the received downlink signal using a first system information RNTI associated with the first type of UE to receive the DCI message for the UE, the first system information RNTI different from a second system information RNTI associated with the second type of UE.

In some examples, to support receiving the DCI message, the scheduling information component 1055 may be configured as or otherwise support a means for receiving, in the DCI message, first scheduling information and second scheduling information, the first scheduling information scheduling the second system information message for the first type of UE, and the second scheduling information scheduling a second system information message for the second type of UE.

In some examples, the DCI component 1035 may be configured as or otherwise support a means for identifying one or more candidate sizes for the DCI message scheduling the second system information message based on the DCI message being for the first type of UE, where the one or more candidate sizes for the DCI message scheduling the second system information message for the first type of UE are different from one or more candidate sizes for the DCI message scheduling the second system information message for the second type of UE.

In some examples, the first set of multiple sets of parameters associated with the first type of UE are a subset of the second set of multiple sets of parameters associated with the second type of UE.

In some examples, the set of parameters of the first set of multiple sets of parameters include a multiplexing pattern between a synchronization signal block that includes the first system information message and the CORESET, a number of resource blocks for the CORESET, a number of symbols for the CORESET, an offset for the CORESET, or a combination thereof.

In some examples, the first type of UE is associated with a reduced bandwidth capability relative to the second type of UE.

Figure 11:
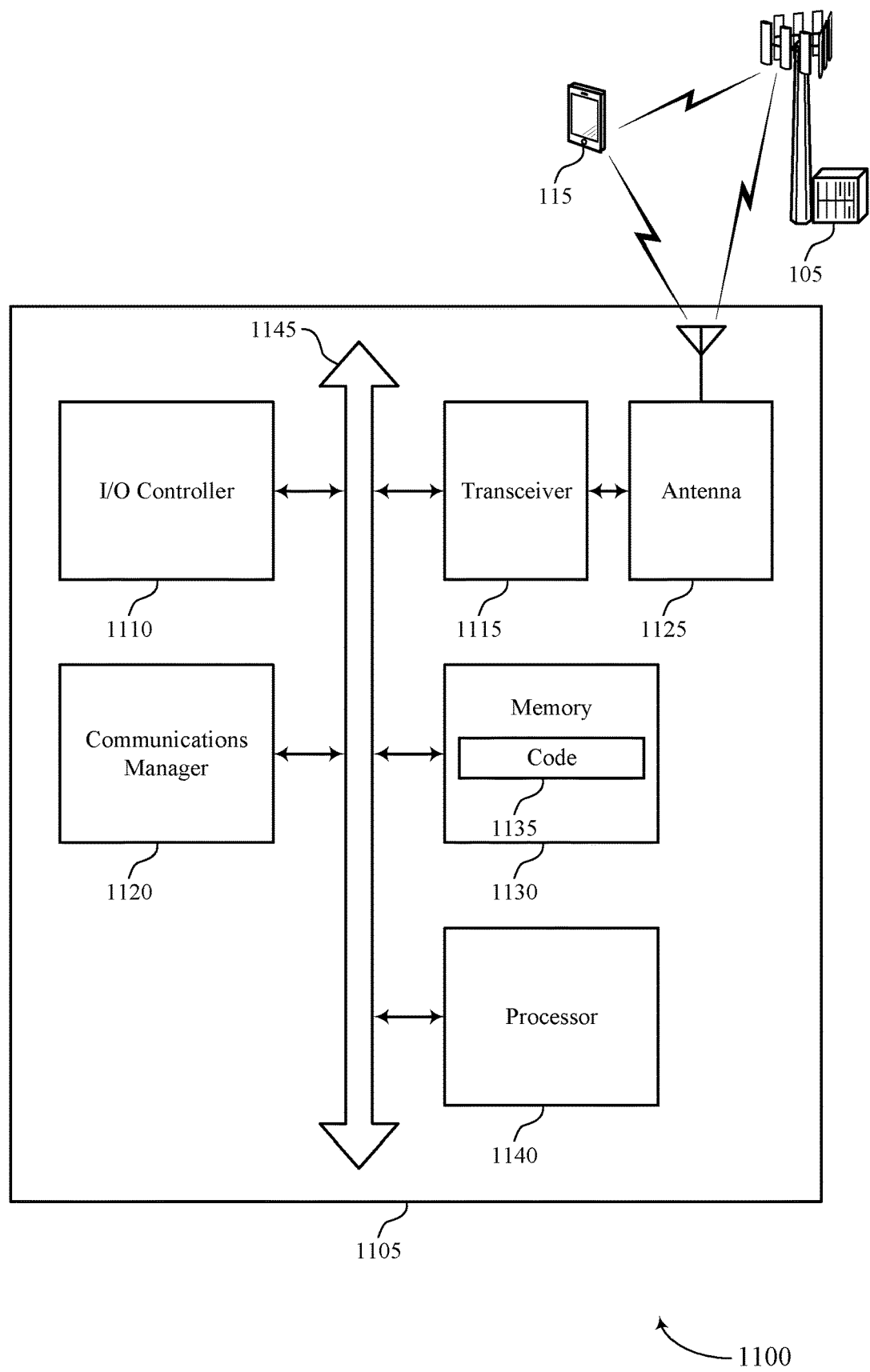
FIG. 11 shows a diagram of a system including a device that supports CORESET configuration for reduced bandwidth UEs in accordance with aspects of the present disclosure.

FIG. 11 shows a diagram of a system 1100 including a device 1105 that supports CORESET configuration for reduced bandwidth UEs in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting CORESET configuration for reduced bandwidth UEs). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving a first system information message from a base station, the first system information message including an indication of a resource configuration for a CORESET, the CORESET including a common search space for a DCI message that schedules a second system information message. The communications manager 1120 may be configured as or otherwise support a means for identifying a set of parameters from a first set of multiple sets of parameters for the CORESET based on the indication received in the first system information message and the UE being a first type of UE, the first set of multiple sets of parameters different from a second set of multiple sets of parameters for the CORESET associated with a second type of UE different from the first type of UE. The communications manager 1120 may be configured as or otherwise support a means for receiving, in the CORESET according to the identified set of parameters, the DCI message scheduling the second system information message.

By including or configuring the communications manager 1120 in accordance with examples as described herein, the device 1105 may support techniques for improved communication reliability, reduced latency, reduced power consumption, more efficient utilization of communication resources, and improved coordination between devices. The device 1105 may support a reduced operating bandwidth, may reduce power consumption and complexity of the device 1105. by supporting a reduced bandwidth size that is large enough to support an SSB, the device 1105 may receive a configuration for a CORESET zero that may be shared with devices that support wider bandwidths, which may improve utilization of communication resources. The configuration for the CORESET may indicate a different PDCCH monitoring pattern for the device 1105 than the different type of device, which may reduce latency and improve communication reliability. Additionally or alternatively, the shared CORESET configuration may improve coordination between the device 1105 and one or more other devices.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of CORESET configuration for reduced bandwidth UEs as described herein, or the processor 1140 and the memory 1130 may be otherwise configured to perform or support such operations.

Figure 12:
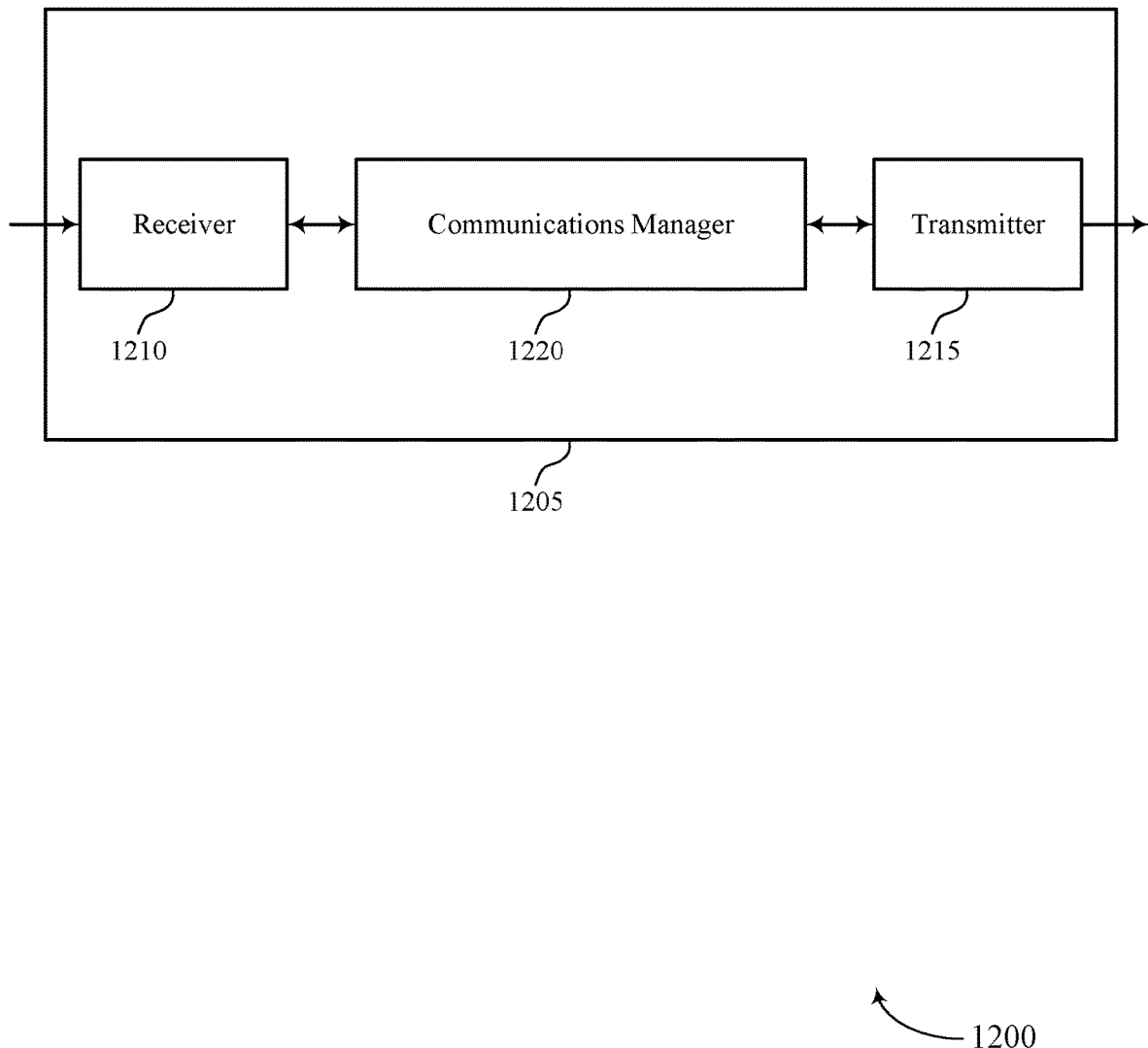
FIGS. 12 and 13 show block diagrams of devices that support CORESET configuration for reduced bandwidth UEs in accordance with aspects of the present disclosure.

FIG. 12 shows a block diagram 1200 of a device 1205 that supports CORESET configuration for reduced bandwidth UEs in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to CORESET configuration for reduced bandwidth UEs). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to CORESET configuration for reduced bandwidth UEs). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of CORESET configuration for reduced bandwidth UEs as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. For example, the communications manager 1220 may be configured as or otherwise support a means for transmitting a first system information message to a UE, the first system information message including an indication of a resource configuration for a CORESET for a first type of UE, the CORESET including a common search space for a DCI message that schedules a second system information message. The communications manager 1220 may be configured as or otherwise support a means for identifying a set of parameters from a first set of multiple sets of parameters for the CORESET based on the indication transmitted in the first system information message and the CORESET being for the first type of UE, the first set of multiple sets of parameters different from a second set of multiple sets of parameters for the CORESET associated with a second type of UE different from the first type of UE. The communications manager 1220 may be configured as or otherwise support a means for transmitting, in the CORESET according to the identified set of parameters, the DCI message scheduling the second system information message.

Figure 13:
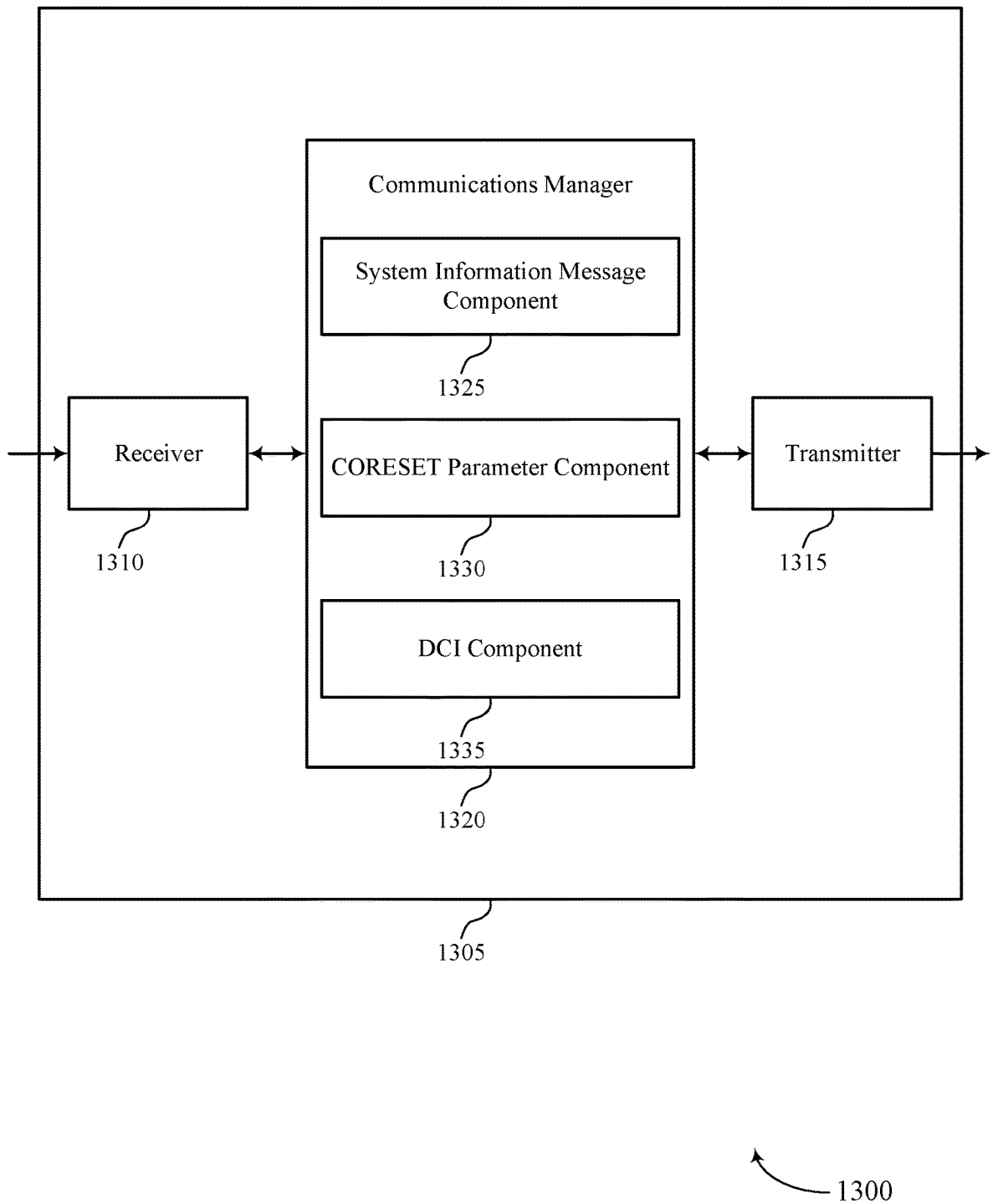

FIG. 13 shows a block diagram 1300 of a device 1305 that supports CORESET configuration for reduced bandwidth UEs in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to CORESET configuration for reduced bandwidth UEs). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to CORESET configuration for reduced bandwidth UEs). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of CORESET configuration for reduced bandwidth UEs as described herein. For example, the communications manager 1320 may include a system information message component 1325, a CORESET parameter component 1330, a DCI component 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. The system information message component 1325 may be configured as or otherwise support a means for transmitting a first system information message to a UE, the first system information message including an indication of a resource configuration for a CORESET for a first type of UE, the CORESET including a common search space for a DCI message that schedules a second system information message. The CORESET parameter component 1330 may be configured as or otherwise support a means for identifying a set of parameters from a first set of multiple sets of parameters for the CORESET based on the indication transmitted in the first system information message and the CORESET being for the first type of UE, the first set of multiple sets of parameters different from a second set of multiple sets of parameters for the CORESET associated with a second type of UE different from the first type of UE. The DCI component 1335 may be configured as or otherwise support a means for transmitting, in the CORESET according to the identified set of parameters, the DCI message scheduling the second system information message.

Figure 14:
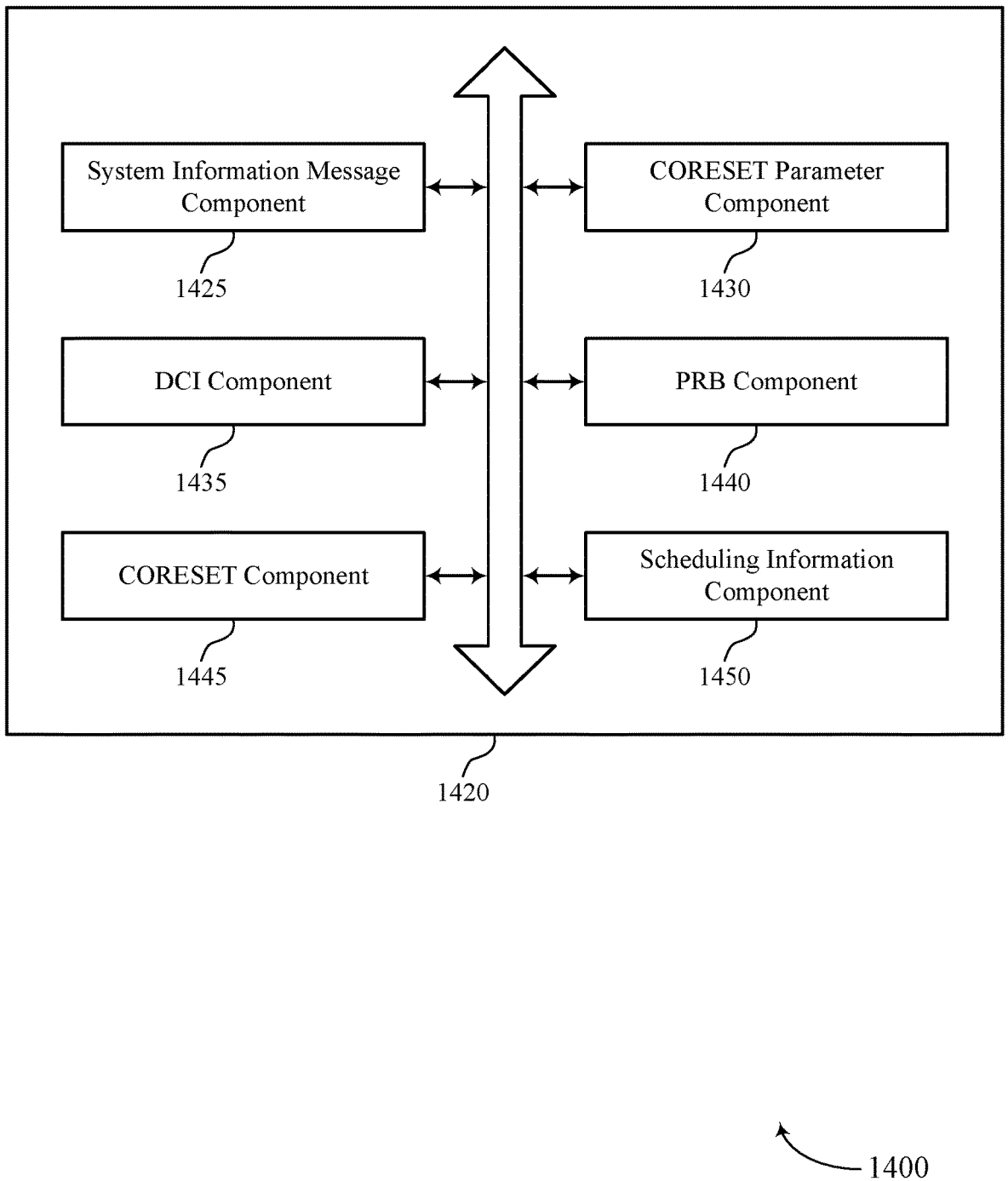
FIG. 14 shows a block diagram of a communications manager that supports CORESET configuration for reduced bandwidth UEs in accordance with aspects of the present disclosure.

FIG. 14 shows a block diagram 1400 of a communications manager 1420 that supports CORESET configuration for reduced bandwidth UEs in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of CORESET configuration for reduced bandwidth UEs as described herein. For example, the communications manager 1420 may include a system information message component 1425, a CORESET parameter component 1430, a DCI component 1435, an PRB component 1440, a CORESET component 1445, a scheduling information component 1450, or any combination thereof. Each of these components may communicate, directly or indirectly, with one another (e.g., via one or more buses).

The communications manager 1420 may support wireless communication at a base station in accordance with examples as disclosed herein. The system information message component 1425 may be configured as or otherwise support a means for transmitting a first system information message to a UE, the first system information message including an indication of a resource configuration for a CORESET for a first type of UE, the CORESET including a common search space for a DCI message that schedules a second system information message. The CORESET parameter component 1430 may be configured as or otherwise support a means for identifying a set of parameters from a first set of multiple sets of parameters for the CORESET based on the indication transmitted in the first system information message and the CORESET being for the first type of UE, the first set of multiple sets of parameters different from a second set of multiple sets of parameters for the CORESET associated with a second type of UE different from the first type of UE. The DCI component 1435 may be configured as or otherwise support a means for transmitting, in the CORESET according to the identified set of parameters, the DCI message scheduling the second system information message.

In some examples, to support identifying the set of parameters from the first set of multiple sets of parameters, the PRB component 1440 may be configured as or otherwise support a means for identifying a first quantity of PRBs for the CORESET based on the CORESET being for the first type of UE, where the indication of the resource configuration for the CORESET is indicative of a second quantity of PRBs different from the first quantity of PRBs.

In some examples, the PRB component 1440 may be configured as or otherwise support a means for identifying, based on the CORESET being for the first type of UE, that PRBs of the CORESET are sequential, where CORESETs including common search spaces configured for the second system information message are interleaved for the second type of UE.

In some examples, to support identifying the set of parameters from the first set of multiple sets of parameters, the CORESET component 1445 may be configured as or otherwise support a means for identifying a first set of slots in which to monitor the CORESET based on the CORESET being for the first type of UE, a second set of slots configured for the second type of UE to monitor the CORESET, where the first set of slots is different from the second set of slots.

In some examples, to support transmitting the DCI message, the DCI component 1435 may be configured as or otherwise support a means for encoding the DCI message using a first system information RNTI associated with the first type of UE, the first system information RNTI different from a second system information RNTI associated with the second type of UE.

In some examples, to support transmitting the DCI message, the scheduling information component 1450 may be configured as or otherwise support a means for transmitting, in the DCI message, first scheduling information and second scheduling information, the first scheduling information scheduling the second system information message for the first type of UE, and the second scheduling information scheduling a second system information message for the second type of UE.

In some examples, the DCI message is one of one or more candidate sizes for the DCI message scheduling the second system information message based on the DCI message being for the first type of UE. In some examples, the one or more candidate sizes for the DCI message scheduling the second system information message for the first type of UE are different from one or more candidate sizes for the DCI message scheduling the second system information message for the second type of UE.

In some examples, the first set of multiple sets of parameters associated with the first type of UE are a subset of the second set of multiple sets of parameters associated with the second type of UE.

In some examples, the set of parameters of the first set of multiple sets of parameters include a multiplexing pattern between a synchronization signal block that includes the first system information message and the CORESET, a number of resource blocks for the CORESET, a number of symbols for the CORESET, an offset for the CORESET, or a combination thereof.

In some examples, the first type of UE is associated with a reduced bandwidth capability relative to the second type of UE.

Figure 15:
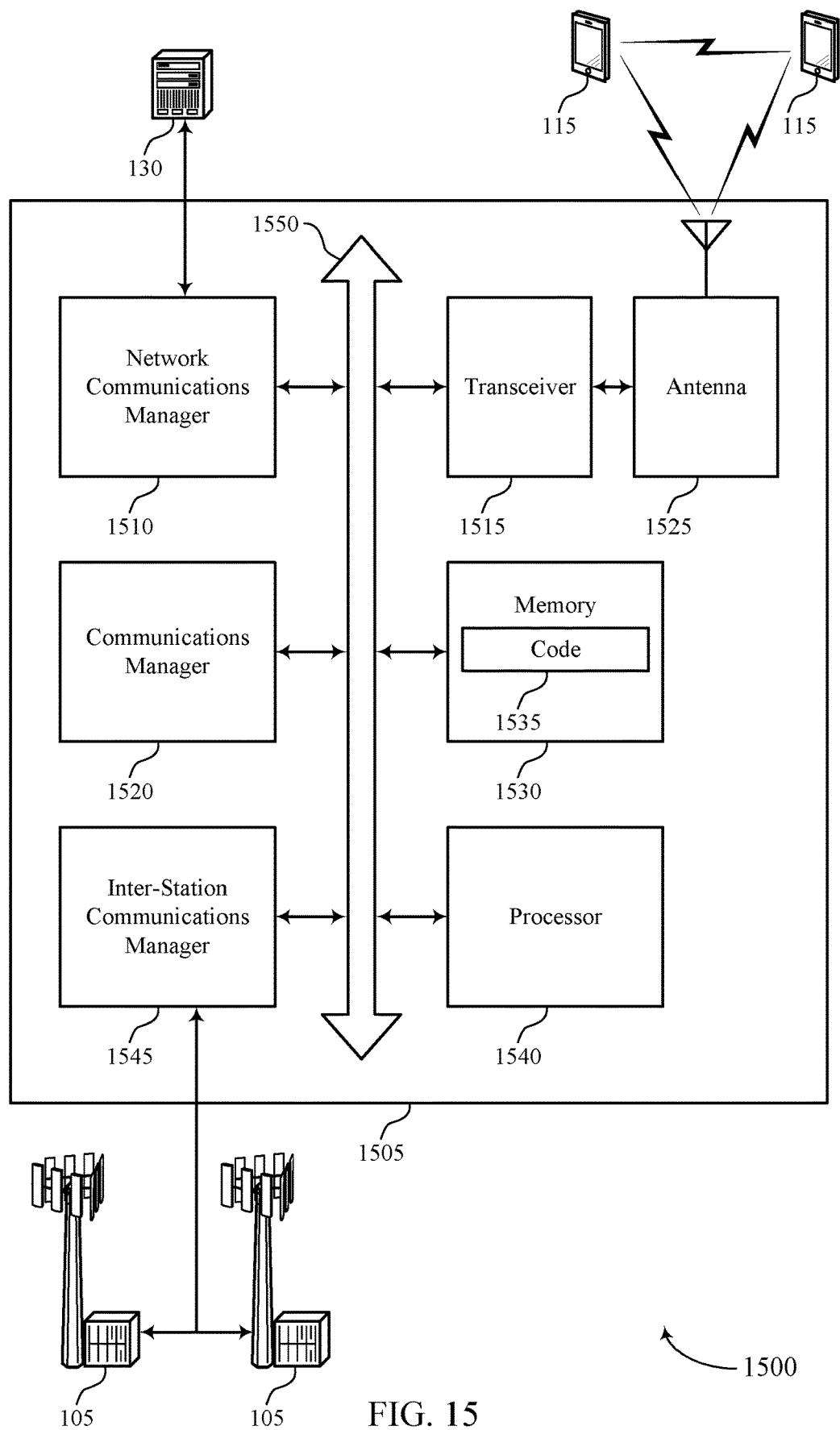
FIG. 15 shows a diagram of a system including a device that supports CORESET configuration for reduced bandwidth UEs in accordance with aspects of the present disclosure.

FIG. 15 shows a diagram of a system 1500 including a device 1505 that supports CORESET configuration for reduced bandwidth UEs in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting CORESET configuration for reduced bandwidth UEs). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at a base station in accordance with examples as disclosed herein. For example, the communications manager 1520 may be configured as or otherwise support a means for transmitting a first system information message to a UE, the first system information message including an indication of a resource configuration for a CORESET for a first type of UE, the CORESET including a common search space for a DCI message that schedules a second system information message. The communications manager 1520 may be configured as or otherwise support a means for identifying a set of parameters from a first set of multiple sets of parameters for the CORESET based on the indication transmitted in the first system information message and the CORESET being for the first type of UE, the first set of multiple sets of parameters different from a second set of multiple sets of parameters for the CORESET associated with a second type of UE different from the first type of UE. The communications manager 1520 may be configured as or otherwise support a means for transmitting, in the CORESET according to the identified set of parameters, the DCI message scheduling the second system information message.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of CORESET configuration for reduced bandwidth UEs as described herein, or the processor 1540 and the memory 1530 may be otherwise configured to perform or support such operations.

Figure 16:
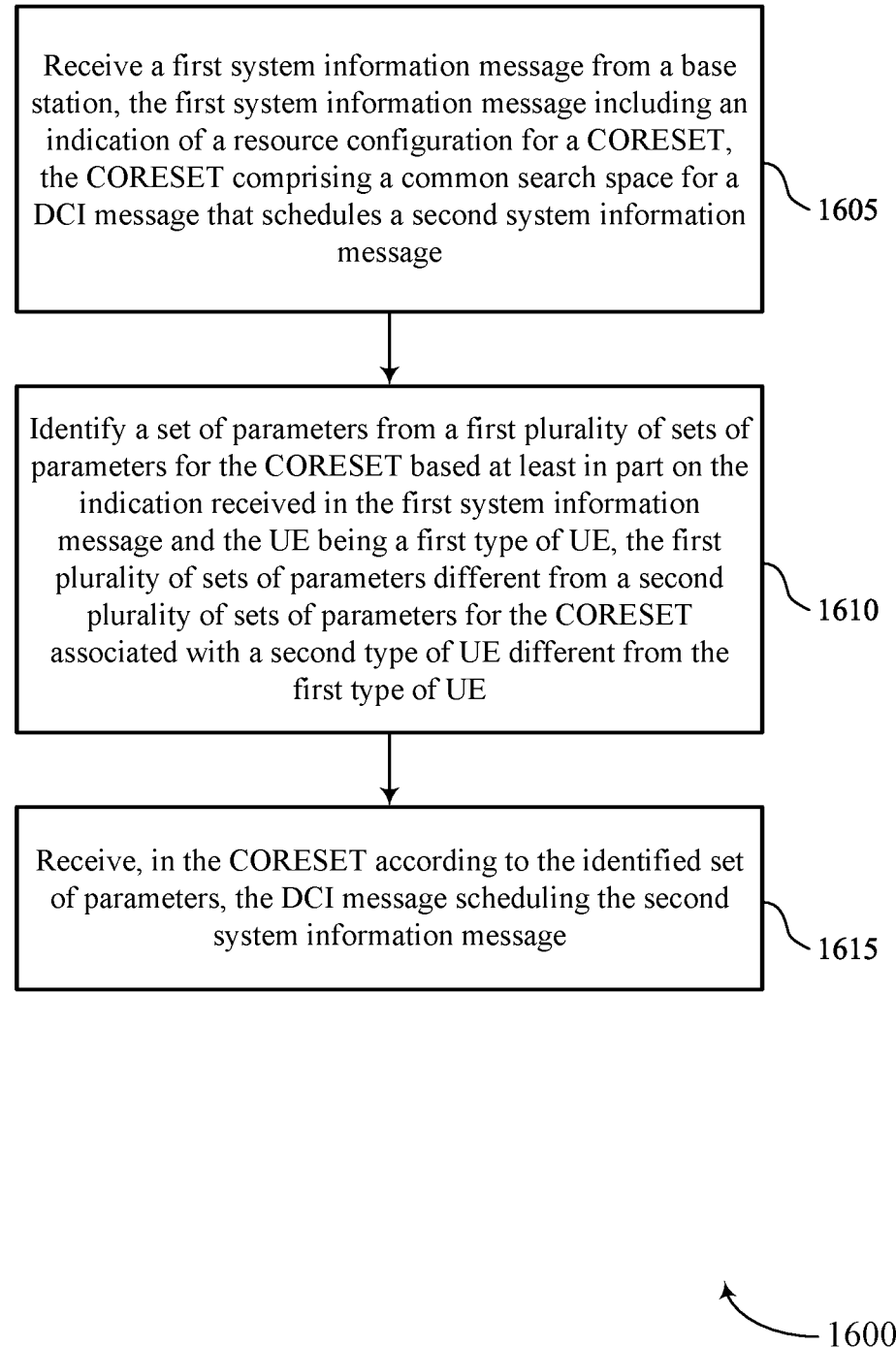
FIGS. 16 through 19 show flowcharts illustrating methods that support CORESET configuration for reduced bandwidth UEs in accordance with aspects of the present disclosure.

FIG. 16 shows a flowchart illustrating a method 1600 that supports CORESET configuration for reduced bandwidth UEs in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include receiving a first system information message from a base station, the first system information message including an indication of a resource configuration for a CORESET, the CORESET including a common search space for a DCI message that schedules a second system information message. The operations of 1605 may be performed in accordance with examples as disclosed herein. In some examples, aspects of the operations of 1605 may be performed by a system information component 1025 as described with reference to FIG. 10.

At 1610, the method may include identifying a set of parameters from a first set of multiple sets of parameters for the CORESET based on the indication received in the first system information message and the UE being a first type of UE, the first set of multiple sets of parameters different from a second set of multiple sets of parameters for the CORESET associated with a second type of UE different from the first type of UE. The operations of 1610 may be performed in accordance with examples as disclosed herein. In some examples, aspects of the operations of 1610 may be performed by a CORESET parameter component 1030 as described with reference to FIG. 10.

At 1615, the method may include receiving, in the CORESET according to the identified set of parameters, the DCI message scheduling the second system information message. The operations of 1615 may be performed in accordance with examples as disclosed herein. In some examples, aspects of the operations of 1615 may be performed by a DCI component 1035 as described with reference to FIG. 10.

Figure 17:
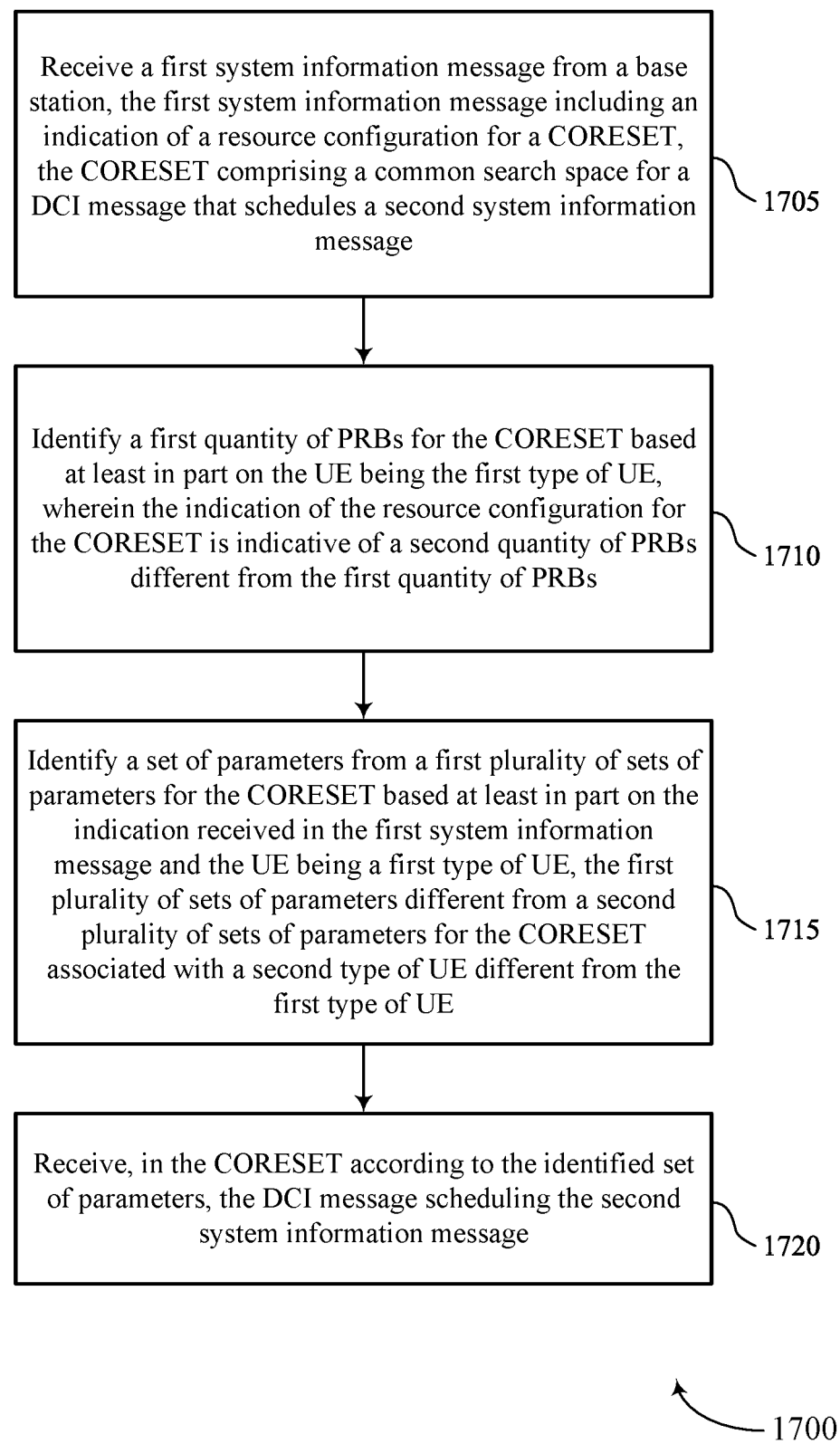

FIG. 17 shows a flowchart illustrating a method 1700 that supports CORESET configuration for reduced bandwidth UEs in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include receiving a first system information message from a base station, the first system information message including an indication of a resource configuration for a CORESET, the CORESET including a common search space for a DCI message that schedules a second system information message. The operations of 1705 may be performed in accordance with examples as disclosed herein. In some examples, aspects of the operations of 1705 may be performed by a system information component 1025 as described with reference to FIG. 10.

At 1710, the method may include identifying a first quantity of PRBs for the CORESET based on the UE being the first type of UE, where the indication of the resource configuration for the CORESET is indicative of a second quantity of PRBs different from the first quantity of PRBs. The operations of 1710 may be performed in accordance with examples as disclosed herein. In some examples, aspects of the operations of 1710 may be performed by an PRB component 1040 as described with reference to FIG. 10.

At 1715, the method may include identifying a set of parameters from a first set of multiple sets of parameters for the CORESET based on the indication received in the first system information message and the UE being a first type of UE, the first set of multiple sets of parameters different from a second set of multiple sets of parameters for the CORESET associated with a second type of UE different from the first type of UE. The operations of 1715 may be performed in accordance with examples as disclosed herein. In some examples, aspects of the operations of 1715 may be performed by a CORESET parameter component 1030 as described with reference to FIG. 10.

At 1720, the method may include receiving, in the CORESET according to the identified set of parameters, the DCI message scheduling the second system information message. The operations of 1720 may be performed in accordance with examples as disclosed herein. In some examples, aspects of the operations of 1720 may be performed by a DCI component 1035 as described with reference to FIG. 10.

Figure 18:
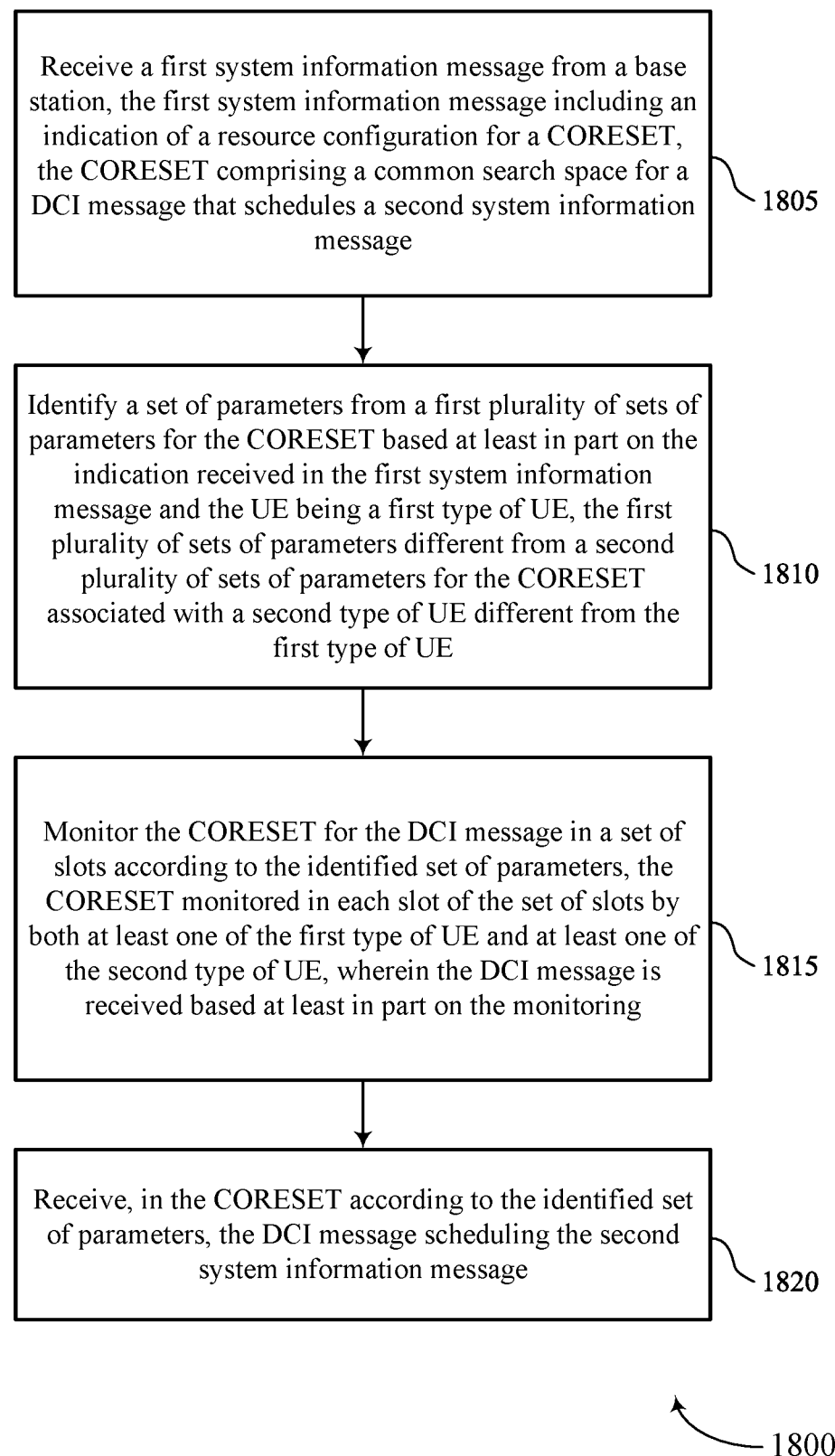

FIG. 18 shows a flowchart illustrating a method 1800 that supports CORESET configuration for reduced bandwidth UEs in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1805, the method may include receiving a first system information message from a base station, the first system information message including an indication of a resource configuration for a CORESET, the CORESET including a common search space for a DCI message that schedules a second system information message. The operations of 1805 may be performed in accordance with examples as disclosed herein. In some examples, aspects of the operations of 1805 may be performed by a system information component 1025 as described with reference to FIG. 10.

At 1810, the method may include identifying a set of parameters from a first set of multiple sets of parameters for the CORESET based on the indication received in the first system information message and the UE being a first type of UE, the first set of multiple sets of parameters different from a second set of multiple sets of parameters for the CORESET associated with a second type of UE different from the first type of UE. The operations of 1810 may be performed in accordance with examples as disclosed herein. In some examples, aspects of the operations of 1810 may be performed by a CORESET parameter component 1030 as described with reference to FIG. 10.

At 1815, the method may include monitoring the CORESET for the DCI message in a set of slots according to the identified set of parameters, the CORESET monitored in each slot of the set of slots by both at least one of the first type of UE and at least one of the second type of UE, where the DCI message is received based on the monitoring. The operations of 1815 may be performed in accordance with examples as disclosed herein. In some examples, aspects of the operations of 1815 may be performed by a CORESET monitoring component 1045 as described with reference to FIG. 10.

At 1820, the method may include receiving, in the CORESET according to the identified set of parameters, the DCI message scheduling the second system information message. The operations of 1820 may be performed in accordance with examples as disclosed herein. In some examples, aspects of the operations of 1820 may be performed by a DCI component 1035 as described with reference to FIG. 10.

Figure 19:
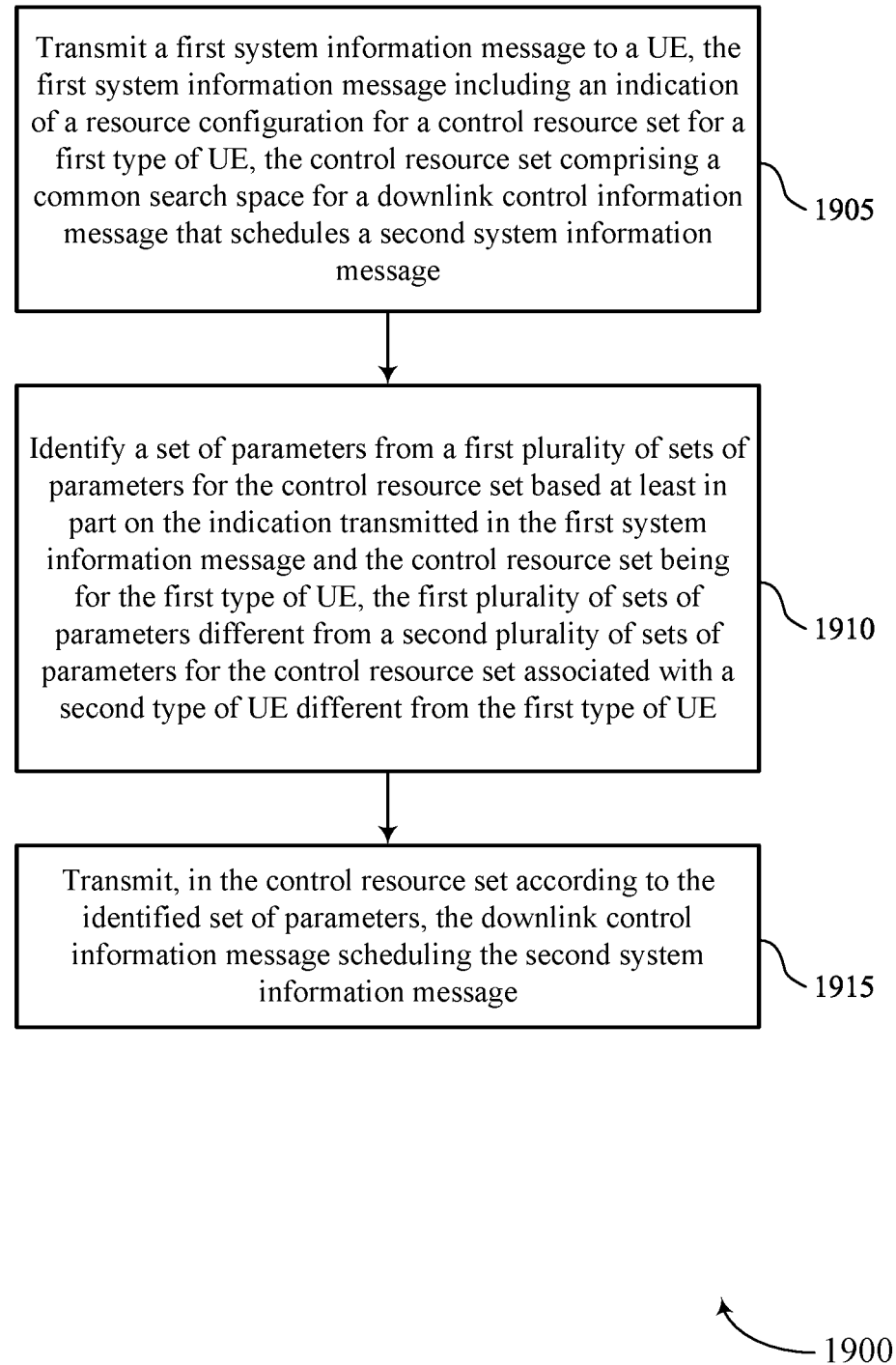

FIG. 19 shows a flowchart illustrating a method 1900 that supports CORESET configuration for reduced bandwidth UEs in accordance with aspects of the present disclosure. The operations of the method 1900 may be implemented by a base station or its components as described herein. For example, the operations of the method 1900 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1905, the method may include transmitting a first system information message to a UE, the first system information message including an indication of a resource configuration for a CORESET for a first type of UE, the CORESET including a common search space for a DCI message that schedules a second system information message. The operations of 1905 may be performed in accordance with examples as disclosed herein. In some examples, aspects of the operations of 1905 may be performed by a system information message component 1425 as described with reference to FIG. 14.

At 1910, the method may include identifying a set of parameters from a first set of multiple sets of parameters for the CORESET based on the indication transmitted in the first system information message and the CORESET being for the first type of UE, the first set of multiple sets of parameters different from a second set of multiple sets of parameters for the CORESET associated with a second type of UE different from the first type of UE. The operations of 1910 may be performed in accordance with examples as disclosed herein. In some examples, aspects of the operations of 1910 may be performed by a CORESET parameter component 1430 as described with reference to FIG. 14.

At 1915, the method may include transmitting, in the CORESET according to the identified set of parameters, the DCI message scheduling the second system information message. The operations of 1915 may be performed in accordance with examples as disclosed herein. In some examples, aspects of the operations of 1915 may be performed by a DCI component 1435 as described with reference to FIG. 14.

The following provides an overview of aspects of the present disclosure:

Aspect 1: A method for wireless communication at a UE, comprising: receiving a first system information message from a base station, the first system information message including an indication of a resource configuration for a CORESET, the CORESET comprising a common search space for a DCI message that schedules a second system information message; identifying a set of parameters from a first plurality of sets of parameters for the CORESET based at least in part on the indication received in the first system information message and the UE being a first type of UE, the first plurality of sets of parameters different from a second plurality of sets of parameters for the CORESET associated with a second type of UE different from the first type of UE; and receiving, in the CORESET according to the identified set of parameters, the DCI message scheduling the second system information message.

Aspect 2: The method of aspect 1, wherein identifying the set of parameters from the first plurality of sets of parameters comprises: identifying a first quantity of PRBs for the CORESET based at least in part on the UE being the first type of UE, wherein the indication of the resource configuration for the CORESET is indicative of a second quantity of PRBs different from the first quantity of PRBs.

Aspect 3: The method of any of aspects 1 through 2, further comprising: identifying, based at least in part on the UE being the first type of UE, that PRBs of the CORESET are sequential, wherein CORESETs comprising common search spaces configured for the second system information message are interleaved for the second type of UE.

Aspect 4: The method of any of aspects 1 through 3, further comprising: monitoring the CORESET for the DCI message in a set of slots according to the identified set of parameters, the CORESET monitored in each slot of the set of slots by both at least one of the first type of UE and at least one of the second type of UE, wherein the DCI message is received based at least in part on the monitoring.

Aspect 5: The method of any of aspects 1 through 3, wherein identifying the set of parameters from the first plurality of sets of parameters comprises: identifying a first set of slots in which to monitor the CORESET based at least in part on the UE being the first type of UE, a second set of slots configured for the second type of UE to monitor the CORESET, wherein the first set of slots is different from the second set of slots.

Aspect 6: The method of any of aspects 1 through 5, wherein receiving the DCI message comprises: receiving a downlink signal in the CORESET according to the identified set of parameters; and decoding the received downlink signal using a first SI-RNTI associated with the first type of UE to receive the DCI message for the UE, the first SI-RNTI different from a second SI-RNTI associated with the second type of UE.

Aspect 7: The method of any of aspects 1 through 5, wherein receiving the DCI message comprises: receiving, in the DCI message, first scheduling information and second scheduling information, the first scheduling information scheduling the second system information message for the first type of UE, and the second scheduling information scheduling a second system information message for the second type of UE.

Aspect 8: The method of any of aspects 1 through 5, further comprising: identifying one or more candidate sizes for the DCI message scheduling the second system information message based at least in part on the DCI message being for the first type of UE, wherein the one or more candidate sizes for the DCI message scheduling the second system information message for the first type of UE are different from one or more candidate sizes for the DCI message scheduling the second system information message for the second type of UE.

Aspect 9: The method of any of aspects 1 through 8, wherein the first plurality of sets of parameters associated with the first type of UE are a subset of the second plurality of sets of parameters associated with the second type of UE.

Aspect 10: The method of any of aspects 1 through 9, wherein the set of parameters of the first plurality of sets of parameters comprise a multiplexing pattern between an SSB that includes the first system information message and the CORESET, a number of resource blocks for the CORESET, a number of symbols for the CORESET, an offset for the CORESET, or a combination thereof.

Aspect 11: The method of any of aspects 1 through 10, wherein the first type of UE is associated with a reduced bandwidth capability relative to the second type of UE.

Aspect 12: A method for wireless communication at a base station, comprising: transmitting a first system information message to a UE, the first system information message including an indication of a resource configuration for a CORESET for a first type of UE, the CORESET comprising a common search space for a DCI message that schedules a second system information message; identifying a set of parameters from a first plurality of sets of parameters for the CORESET based at least in part on the indication transmitted in the first system information message and the CORESET being for the first type of UE, the first plurality of sets of parameters different from a second plurality of sets of parameters for the CORESET associated with a second type of UE different from the first type of UE; and transmitting, in the CORESET according to the identified set of parameters, the DCI message scheduling the second system information message.

Aspect 13: The method of aspect 12, wherein identifying the set of parameters from the first plurality of sets of parameters comprises: identifying a first quantity of PRBs for the CORESET based at least in part on the CORESET being for the first type of UE, wherein the indication of the resource configuration for the CORESET is indicative of a second quantity of PRBs different from the first quantity of PRBs.

Aspect 14: The method of any of aspects 12 through 13, further comprising: identifying, based at least in part on the CORESET being for the first type of UE, that PRBs of the CORESET are sequential, wherein CORESETs comprising common search spaces configured for the second system information message are interleaved for the second type of UE.

Aspect 15: The method of any of aspects 12 through 14, wherein identifying the set of parameters from the first plurality of sets of parameters comprises: identifying a first set of slots in which to monitor the CORESET based at least in part on the CORESET being for the first type of UE, a second set of slots configured for the second type of UE to monitor the CORESET, wherein the first set of slots is different from the second set of slots.

Aspect 16: The method of any of aspects 12 through 15, wherein transmitting the DCI message comprises: encoding the DCI message using a first SI-RNTI associated with the first type of UE, the first SI-RNTI different from a second SI-RNTI associated with the second type of UE.

Aspect 17: The method of any of aspects 12 through 15, wherein transmitting the DCI message comprises: transmitting, in the DCI message, first scheduling information and second scheduling information, the first scheduling information scheduling the second system information message for the first type of UE, and the second scheduling information scheduling a second system information message for the second type of UE.

Aspect 18: The method of any of aspects 12 through 15, wherein the DCI message is one of one or more candidate sizes for the DCI message scheduling the second system information message based at least in part on the DCI message being for the first type of UE, the one or more candidate sizes for the DCI message scheduling the second system information message for the first type of UE are different from one or more candidate sizes for the DCI message scheduling the second system information message for the second type of UE.

Aspect 19: The method of any of aspects 12 through 18, wherein the first plurality of sets of parameters associated with the first type of UE are a subset of the second plurality of sets of parameters associated with the second type of UE.

Aspect 20: The method of any of aspects 12 through 19, wherein the set of parameters of the first plurality of sets of parameters comprise a multiplexing pattern between an SSB that includes the first system information message and the CORESET, a number of resource blocks for the CORESET, a number of symbols for the CORESET, an offset for the CORESET, or a combination thereof.

Aspect 21: The method of any of aspects 12 through 20, wherein the first type of UE is associated with a reduced bandwidth capability relative to the second type of UE.

Aspect 22: An apparatus for wireless communication at a UE, comprising a processor; memory coupled with the processor; and instructions stored in the memory and executable by the processor to cause the apparatus to perform a method of any of aspects 1 through 11.

Aspect 23: An apparatus for wireless communication at a UE, comprising at least one means for performing a method of any of aspects 1 through 11.

Aspect 24: A non-transitory computer-readable medium storing code for wireless communication at a UE, the code comprising instructions executable by a processor to perform a method of any of aspects 1 through 11.

Aspect 25: An apparatus for wireless communication at a base station, comprising a processor; memory coupled with the processor; and instructions stored in the memory and executable by the processor to cause the apparatus to perform a method of any of aspects 12 through 21.

Aspect 26: An apparatus for wireless communication at a base station, comprising at least one means for performing a method of any of aspects 12 through 21.

Aspect 27: A non-transitory computer-readable medium storing code for wireless communication at a base station, the code comprising instructions executable by a processor to perform a method of any of aspects 12 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a first system information message from a base station, the first system information message including an indication of a resource configuration for a control resource set, the control resource set comprising a common search space for a downlink control information message that schedules a second system information message;
   identifying a set of parameters from a first plurality of sets of parameters for the control resource set based at least in part on the indication received in the first system information message and the UE being a first type of UE, the first plurality of sets of parameters different from a second plurality of sets of parameters for the control resource set associated with a second type of UE different from the first type of UE; and
   receiving, in the control resource set according to the identified set of parameters, the downlink control information message scheduling the second system information message.

2. The method of claim 1, wherein identifying the set of parameters from the first plurality of sets of parameters comprises:
   identifying a first quantity of physical resource blocks for the control resource set based at least in part on the UE being the first type of UE, wherein the indication of the resource configuration for the control resource set is indicative of a second quantity of physical resource blocks different from the first quantity of physical resource blocks.

3. The method of claim 1, further comprising:
   identifying, based at least in part on the UE being the first type of UE, that physical resource blocks of the control resource set are sequential, wherein control resource sets comprising common search spaces configured for the second system information message are interleaved for the second type of UE.

4. The method of claim 1, further comprising:
   monitoring the control resource set for the downlink control information message in a set of slots according to the identified set of parameters, the control resource set monitored in each slot of the set of slots by both at least one of the first type of UE and at least one of the second type of UE, wherein the downlink control information message is received based at least in part on the monitoring.

5. The method of claim 1, wherein identifying the set of parameters from the first plurality of sets of parameters comprises:
   identifying a first set of slots in which to monitor the control resource set based at least in part on the UE being the first type of UE, a second set of slots configured for the second type of UE to monitor the control resource set, wherein the first set of slots is different from the second set of slots.

6. The method of claim 1, wherein receiving the downlink control information message comprises:
   receiving a downlink signal in the control resource set according to the identified set of parameters; and
   decoding the received downlink signal using a first system information radio network temporary identifier associated with the first type of UE to receive the downlink control information message for the UE, the first system information radio network temporary identifier different from a second system information radio network temporary identifier associated with the second type of UE.

7. The method of claim 1, wherein receiving the downlink control information message comprises:
   receiving, in the downlink control information message, first scheduling information and second scheduling information, the first scheduling information scheduling the second system information message for the first type of UE, and the second scheduling information scheduling a second system information message for the second type of UE.

8. The method of claim 1, further comprising:
   identifying one or more candidate sizes for the downlink control information message scheduling the second system information message based at least in part on the downlink control information message being for the first type of UE, wherein the one or more candidate sizes for the downlink control information message scheduling the second system information message for the first type of UE are different from one or more candidate sizes for the downlink control information message scheduling the second system information message for the second type of UE.

9. The method of claim 1, wherein the first plurality of sets of parameters associated with the first type of UE are a subset of the second plurality of sets of parameters associated with the second type of UE.

10. The method of claim 1, wherein the set of parameters of the first plurality of sets of parameters comprise a multiplexing pattern between a synchronization signal block that includes the first system information message and the control resource set, a number of resource blocks for the control resource set, a number of symbols for the control resource set, an offset for the control resource set, or a combination thereof.

11. The method of claim 1, wherein the first type of UE is associated with a reduced bandwidth capability relative to the second type of UE.

12. A method for wireless communication at a base station, comprising:
- transmitting a first system information message to a user equipment (UE), the first system information message including an indication of a resource configuration for a control resource set for a first type of UE, the control resource set comprising a common search space for a downlink control information message that schedules a second system information message;
- identifying a set of parameters from a first plurality of sets of parameters for the control resource set based at least in part on the indication transmitted in the first system information message and the control resource set being for the first type of UE, the first plurality of sets of parameters different from a second plurality of sets of parameters for the control resource set associated with a second type of UE different from the first type of UE; and
- transmitting, in the control resource set according to the identified set of parameters, the downlink control information message scheduling the second system information message.

13. The method of claim 12, wherein identifying the set of parameters from the first plurality of sets of parameters comprises:
- identifying a first quantity of physical resource blocks for the control resource set based at least in part on the control resource set being for the first type of UE, wherein the indication of the resource configuration for the control resource set is indicative of a second quantity of physical resource blocks different from the first quantity of physical resource blocks.

14. The method of claim 12, further comprising:
- identifying, based at least in part on the control resource set being for the first type of UE, that physical resource blocks of the control resource set are sequential, wherein control resource sets comprising common search spaces configured for the second system information message are interleaved for the second type of UE.

15. The method of claim 12, wherein identifying the set of parameters from the first plurality of sets of parameters comprises:
- identifying a first set of slots in which to monitor the control resource set based at least in part on the control resource set being for the first type of UE, a second set of slots configured for the second type of UE to monitor the control resource set, wherein the first set of slots is different from the second set of slots.

16. The method of claim 12, wherein transmitting the downlink control information message comprises:
- encoding the downlink control information message using a first system information radio network temporary identifier associated with the first type of UE, the first system information radio network temporary identifier different from a second system information radio network temporary identifier associated with the second type of UE.

17. The method of claim 12, wherein transmitting the downlink control information message comprises:
- transmitting, in the downlink control information message, first scheduling information and second scheduling information, the first scheduling information scheduling the second system information message for the first type of UE, and the second scheduling information scheduling a second system information message for the second type of UE.

18. The method of claim 12, wherein
- the downlink control information message is one of one or more candidate sizes for the downlink control information message scheduling the second system information message based at least in part on the downlink control information message being for the first type of UE,
- the one or more candidate sizes for the downlink control information message scheduling the second system information message for the first type of UE are different from one or more candidate sizes for the downlink control information message scheduling the second system information message for the second type of UE.

19. The method of claim 12, wherein the first plurality of sets of parameters associated with the first type of UE are a subset of the second plurality of sets of parameters associated with the second type of UE.

20. The method of claim 12, wherein the set of parameters of the first plurality of sets of parameters comprise a multiplexing pattern between a synchronization signal block that includes the first system information message and the control resource set, a number of resource blocks for the control resource set, a number of symbols for the control resource set, an offset for the control resource set, or a combination thereof.

21. The method of claim 12, wherein the first type of UE is associated with a reduced bandwidth capability relative to the second type of UE.

22. An apparatus for wireless communication at a user equipment (UE), comprising:
- a processor;
- memory coupled with the processor; and
- instructions stored in the memory and executable by the processor to cause the apparatus to:
  - receive a first system information message from a base station, the first system information message including an indication of a resource configuration for a control resource set, the control resource set comprising a common search space for a downlink control information message that schedules a second system information message;
  - identify a set of parameters from a first plurality of sets of parameters for the control resource set based at least in part on the indication received in the first system information message and the UE being a first type of UE, the first plurality of sets of parameters different from a second plurality of sets of parameters for the control resource set associated with a second type of UE different from the first type of UE; and
  - receive, in the control resource set according to the identified set of parameters, the downlink control information message scheduling the second system information message.

23. The apparatus of claim 22, wherein the instructions to identify the set of parameters from the first plurality of sets of parameters are executable by the processor to cause the apparatus to:
- identify a first quantity of physical resource blocks for the control resource set based at least in part on the UE being the first type of UE, wherein the indication of the resource configuration for the control resource set is indicative of a second quantity of physical resource blocks different from the first quantity of physical resource blocks.

24. The apparatus of claim 22, wherein the instructions are further executable by the processor to cause the apparatus to:
identify, based at least in part on the UE being the first type of UE, that physical resource blocks of the control resource set are sequential, wherein control resource sets comprising common search spaces configured for the second system information message are interleaved for the second type of UE.

25. The apparatus of claim 22, wherein the instructions are further executable by the processor to cause the apparatus to:
monitor the control resource set for the downlink control information message in a set of slots according to the identified set of parameters, the control resource set monitored in each slot of the set of slots by both at least one of the first type of UE and at least one of the second type of UE, wherein the downlink control information message is received based at least in part on the monitoring.

26. The apparatus of claim 22, wherein the instructions to identify the set of parameters from the first plurality of sets of parameters are executable by the processor to cause the apparatus to:
identify a first set of slots in which to monitor the control resource set based at least in part on the UE being the first type of UE, a second set of slots configured for the second type of UE to monitor the control resource set, wherein the first set of slots is different from the second set of slots.

27. An apparatus for wireless communication at a base station, comprising:
a processor;
memory coupled with the processor; and
instructions stored in the memory and executable by the processor to cause the apparatus to:
transmit a first system information message to a user equipment (UE), the first system information message including an indication of a resource configuration for a control resource set for a first type of UE, the control resource set comprising a common search space for a downlink control information message that schedules a second system information message;
identify a set of parameters from a first plurality of sets of parameters for the control resource set based at least in part on the indication transmitted in the first system information message and the control resource set being for the first type of UE, the first plurality of sets of parameters different from a second plurality of sets of parameters for the control resource set associated with a second type of UE different from the first type of UE; and
transmit, in the control resource set according to the identified set of parameters, the downlink control information message scheduling the second system information message.

28. The apparatus of claim 27, wherein the instructions to identify the set of parameters from the first plurality of sets of parameters are executable by the processor to cause the apparatus to:
identify a first quantity of physical resource blocks for the control resource set based at least in part on the control resource set being for the first type of UE, wherein the indication of the resource configuration for the control resource set is indicative of a second quantity of physical resource blocks different from the first quantity of physical resource blocks.

29. The apparatus of claim 27, wherein the instructions are further executable by the processor to cause the apparatus to:
identify, based at least in part on the control resource set being for the first type of UE, that physical resource blocks of the control resource set are sequential, wherein control resource sets comprising common search spaces configured for the second system information message are interleaved for the second type of UE.

30. The apparatus of claim 27, wherein the instructions to identify the set of parameters from the first plurality of sets of parameters are executable by the processor to cause the apparatus to:
identify a first set of slots in which to monitor the control resource set based at least in part on the control resource set being for the first type of UE, a second set of slots configured for the second type of UE to monitor the control resource set, wherein the first set of slots is different from the second set of slots.

* * * * *